United States Patent [19]
Minowa et al.

[11] Patent Number: 5,760,749
[45] Date of Patent: Jun. 2, 1998

[54] ANTENNA INTEGRAL-TYPE TRANSMITTER/RECEIVER SYSTEM

[75] Inventors: Yoshiaki Minowa; Kazuo Kumahara; Yuichi Hagiwara; Toshimitsu Kobayashi; Masahiko Kaneko, all of Kawasaki, Japan

[73] Assignee: Fujitsu Limited, Kawasaki, Japan

[21] Appl. No.: 525,737

[22] PCT Filed: Sep. 29, 1994

[86] PCT No.: PCT/JP94/01621

§ 371 Date: Sep. 25, 1995

§ 102(e) Date: Sep. 25, 1995

[87] PCT Pub. No.: WO95/25387

PCT Pub. Date: Sep. 21, 1995

[30] Foreign Application Priority Data

Mar. 17, 1994 [JP] Japan .................. 6-047040

[51] Int. Cl.⁶ .................... H01Q 13/00
[52] U.S. Cl. .............. 343/772; 343/786; 343/882
[58] Field of Search ............ 343/772, 775, 343/786, 765, 878, 882; H01Q 13/00, 13/02, 19/12, 1/12, 23/00

[56] References Cited

U.S. PATENT DOCUMENTS

| | | | |
|---|---|---|---|
| 4,473,828 | 9/1984 | Mörz et al. | 343/786 |
| 4,797,684 | 1/1989 | Bernstein et al. | 343/772 |
| 5,003,321 | 3/1991 | Smith et al. | 343/786 |
| 5,317,329 | 5/1994 | Hatasa | 343/772 |
| 5,563,618 | 10/1996 | Tamura | 343/772 |
| 5,568,160 | 10/1996 | Collins | 343/786 |

OTHER PUBLICATIONS

K. Taniguchi et al. "Shielding Structure of Mobile Phoen", Japanese Patent Laid–Open (kokai) No. HEI 5–29785 Laid–Open Date: Feb. 5, 1993.

Y. Nonaka "Portable Reception Antenna System", Japanese Patent Laid–Open (kokai) No. HEI 1–12702 Laid–Open Date: Jan. 17, 1989.

K. Omiya et al. "Electronic Circuit with Plane Antenna", Japanese Patent Laid–Open (kokai) No. HEI 2–244803 Laid–Open Date: Sep. 28, 1990.

F. Ogata et al. "Radio Communication Equipment", Japanese Patent Laid–Open (kokai) No. SHO 60–126929 Laid–Open Date: Jul. 6, 1985.

S. Ueno "Polarized Wave Plane Switching Display Unit for Primary Radiator", Japanese Patent/Utility Model Laid–Open (kokai) No. HEI 3–84601 Laid–Open Date: Aug. 28, 1991.

(List continued on next page.)

*Primary Examiner*—Donald T. Hajec
*Assistant Examiner*—Tan Ho
*Attorney, Agent, or Firm*—Armstrong, Westerman, Hattori, McLeland & Naughton

[57] ABSTRACT

An antenna integral-type transmitter/receiver system to be installed outdoors and used for transmission and reception of radio signals. The object is to provide a small, lightweight antenna integral-type transmitter/receiver system formed of the reduced number of parts and assembling steps. The antenna integral-type transmitter/receiver system consists of a housing having one end surface in which an opening is formed and the other end surface in which an antenna mounting surface is formed, and including a transmitter/receiver function unit formed of a waveguide circuit unit, a high-frequency electrical circuit unit, and an intermediate frequency electrical circuit unit; an antenna connected to the transmitter/receiver function unit mounted on the other end surface of the housing; and a cover member for closing the opening of the one end surface of the housing. The waveguide circuit unit and the high-frequency electrical circuit unit form a first unit. The intermediate frequency electrical circuit unit forms a second unit. The first unit and the second unit are arranged so as to be stacked in the housing.

24 Claims, 25 Drawing Sheets

OTHER PUBLICATIONS

M. Washimi "Unit Mounting Structure for Communications Equipment", Japanese Patent/Utility Model Laid–Open (kokai) No. HEI 2–41584 Laid–Open Date: Mar. 22, 1990.

R. Yamamoto et al. "Harmonic Device", Japanese Patent/Utility Model Laid–Open (kokai) No. SHO 63–106197 Laid–Open Date: Jul. 8, 1988.

T. Kamimura "Polarized Wave Selector for Primary Radiator", Japanese Patent/Utility Model Laid–Open (kokai) No. HEI 3–128301 Laid–Open Date: Dec. 23, 1991.

K. Katsurada "Heater Mounting Structure", Japanese Patent/Utility Model Laid–Open (kokai) No. SHO 63–132498 Laid–Open Date: Aug. 30, 1988.

K. Kumahara et al. "Outdoor Storage Container for Radio Equipment", Japanese Patent/Utility Model Laid–Open (kokai) No. SHO 60–142542 Laid–Open Date: Sep. 20, 1985.

F. Ogata et al. "Antenna Supporting Device", Japanese Patent/Utility Model Laid–Open (kokai) No.SHO 58–101509 Laid–Open Date: Jul. 11, 1983.

F I G. 12
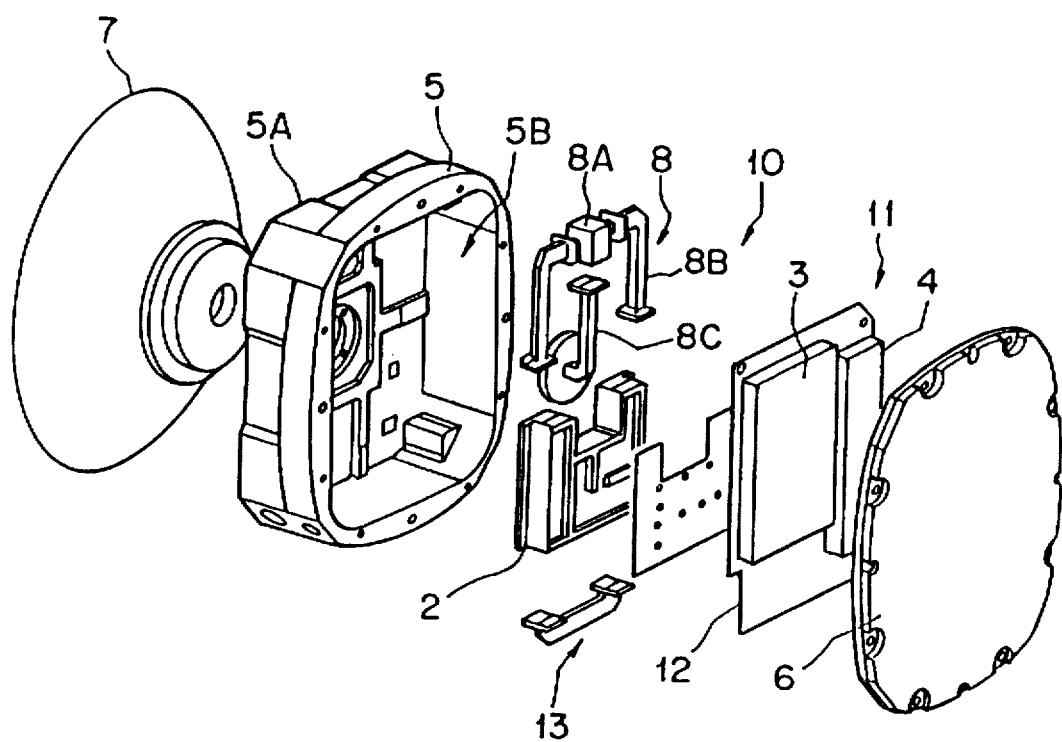

ANTENNA INTEGRAL-TYPE TRANSMITTER/RECEIVER SYSTEM

BACKGROUND OF THE INVENTION

1. Field of the Invention

The present invention relates to an antenna integral-type transmitter/receiver system that is chiefly installed outdoors for use in transmitting and receiving radio signals.

2. Description of the Related Art

Generally, there are antenna integral-type transmitter/receiver systems each integrally formed of an antenna 7 and a transmitter/receiver system body 1, as shown in FIG. 28, acting as submilliwave or milliwave band radio equipment used for subscriber radio or the like.

Two sets of radio equipment, as shown in FIG. 27, are respectively installed facing each other on the two remote buildings 40 and 41, for example, and are used as means for performing mutual communications between two buildings 40 and 41. This radio equipment may be used for a variety of applications other than communication means between two buildings 40 and 41.

The antenna integral-type transmitter/receiver system has its internal configuration as shown in FIG. 29. The transmitter/receiver system body 1 consists of a high-frequency electrical circuit unit (RF unit) 2, an intermediate frequency electrical circuit unit (IF unit) 3, a power supply unit (PS unit) 4, a case 5 acting as a housing, and a cover member 6.

The main electrical circuit units 2, 3, and 4 are independently housed as respective units for insertion into or extraction out of the case 5. Thus an exchange can be made to each of the printed wiring boards for the main circuit units. If the transmitter/receiver system body 1 is maintained, inspected, or repaired, an abnormal circuit is exchanged for the whole unit. Referring to FIG. 29, numeral 15 represents an external interface connector.

Moreover, as shown in FIG. 30, in the antenna integral-type transmitter/receiver system, a horizontal/vertical conversion waveguide (VH conversion waveguide) 44 is mounted at the juncture of the antenna (this figure showing an example in which an axially-symmetrical parabola antenna is used as an antenna 7) 7 and the waveguide input/output unit 8D. This VH conversion waveguide 44 implements a horizontal/vertical polarized wave conversion. FIG. 31 illustrates an example of a horizontal (H) conversion and an example of a vertical (V) conversion. That is, in the case of the horizontal conversion, three members 44a, 44b, and 44c each with the opening having a gradual different angle are overlapped with each other. In the case of the vertical conversion, the member 44d is used which has an opening whose angle is not twisted and a thickness corresponding to the total thickness of, for example, the three members 44a, 44b, and 44c.

It is required that the radio equipment is, in nature, at low price, easy to be handled, and can be installed anywhere. Hence, it has been strongly desired that the radio equipment is small in size, lightweight, and low in cost.

With the device down-sized and manufactured at low cost, it is becoming mainstream that in order to reduce markedly working hours, the whole device is replaced, rather than that a defect spot is checked with maintenance tools at a failure time and then the defect unit is replaced for a new one. Hence there is a decreasing need for dividing the internal unit.

On the other hand, in the device shown in FIG. 29, the RF unit 2, the IF unit 3, and the PS unit 4 each made in a united form increase the number of parts and assembling steps, so that the increased number of the assembling steps decreases the manufacturing efficiency (or occurring the so-called division loss). Moreover, the difficulty in converting circuits into a LSI or MMIC form impedes a device miniaturization.

The present invention overcomes the above mentioned problems. An object of the present invention is to provide a small, lightweight antenna integral-type transmitter/receiver system which realizes the reduced number of parts and assembling steps.

SUMMARY OF THE INVENTION

For that reason, according to the present invention, the antenna integral-type transmitter/receiver system is characterized by a housing having one end surface in which an opening is formed and the other end in which an antenna mounting surface is formed, and including a transmitter/receiver function unit formed internally of a waveguide circuit unit, a high-frequency electrical circuit unit, and an intermediate electrical circuit unit; an antenna connected to the transmitter/receiver function unit mounted on the other surface of the housing; and a cover member for closing the opening of the one end surface of the housing; the waveguide circuit unit and the high-frequency electrical circuit unit forming a first unit; the intermediate electrical circuit unit forming a second unit; the first unit and the second unit being arranged so as to be stacked in the housing.

The housing member closes the opening of one end surface of the cover while it allows the antenna to be connected to the transmitter/receiver function unit and to be mounted on the other end surface of the housing.

Moreover, the electrical circuit unit in each of the first unit and the second unit may be arranged on a common printed wiring board. This arrangement allows the entire equipment to be reduced in size.

Moreover, the printed wiring board and the waveguide circuit unit are arranged in the housing in the order of the printed wiring board and the waveguide circuit unit, and the waveguide circuit unit may be connected to the antenna via the opening formed in the middle portion of the printed wiring board.

The waveguide circuit portion and the printed wiring board may be arranged in the housing in the order of the waveguide circuit unit and the printed wiring board. This arrangement realizes the small-sized equipment.

Furthermore, the high-frequency electrical circuit unit and other waveguide circuit unit may be arranged coaxially around a waveguide input/output unit connected to the antenna in the waveguide circuit unit and the intermediate electrical circuit unit and the power supply unit are arranged outside the high-frequency electrical circuit unit and other waveguide circuit unit.

The housing has its vertically and horizontally symmetrical outline and can be rotated 90° to perform a horizontal and vertical conversion while the housing is attached to the antenna. The vertical and horizontal conversion can be performed by rotating the whole housing with the antenna 90°.

A shield cover may be formed on the fixture surface of the printed wiring board in the housing, the shield cover having a trench, groove, or separation unit to relieve parts or leads assembled on the printed wiring board. The trench, groove, or separation unit ensures the clearance of the mounted parts or leads assembled on the printed wiring board and the housing acts as a shield cover.

The printed wiring board may be assembled inside the housing via a base member. In this case, the base plate functions as a shield cover.

The base member has a trench, groove, or separation unit which relieves parts or leads assembled on the printed wiring board, the base member acting as a shield cover. Hence, the housing can be shared by changing the base member, together with modification of the printed wiring board.

The antenna mounting surface of the housing may be used as a ground conductor and a base plate for a plane antenna.

Moreover, the antenna mounting surface of the housing may be used as a main reflector of a parabola antenna.

A sheet heater may be arranged inside the cover member. In this case, warming the electrical components inside the system enables the use in cold-weather areas. The general specifications and the cold-weather area specifications can be prepared merely by replacing the cover member.

An external interface connector and a positional alignment member may be arranged on an outer side surface of the housing coaxially with respect to the antenna mounting center portion and over a diagonal line crossing the housing from the end surface to end surface. In this form, the horizontal/vertical polarized wave conversion can be performed by rotating the system body 90°, without significantly changing the external appearance.

The housing and the cover member may be made of a good conductive and good refractory member. The system can be installed at any place.

Furthermore, a device fitment may be arranged between the housing and the antenna.

A device support member for supporting the housing via the device fitment may be prepared, and an attitude adjusting unit may be mounted on the device support member for adjusting the attitude of the antenna and the housing. In this construction, the device support member supports the housing via the device fitment, and the attitude adjusting unit adjusts the attitudes of the housing and the antenna.

A device support member mounted on said housing for supporting the housing and the antenna may be prepared, and an attitude adjusting unit may be mounted on the device support member for adjusting the attitude of the housing and the antenna. Thus, the housing and the antenna are supported. The attitude adjusting unit arranged on the device support member adjusts the attitude of the housing and the antenna.

A sunshade cover may be mounted on said housing for covering the housing.

A through-opening corresponding to a waveguide may be formed in the antenna mounting surface of the housing, the through opening acting as the device input/output unit. The waveguide can be fitted to the housing via the through-opening.

According to the present invention, the antenna integral-type transmitter/receiver system is characterized by a housing having an opening formed on one end surface thereof and including internally an intermediate electrical circuit portion; a base plate which closes one end surface of the housing, said base plate on which a waveguide circuit unit and a high-frequency electrical circuit unit forming a transmission and reception function unit are mounted on the side surface of the housing, together with the intermediate electrical circuit unit, the base plate having an antenna mounting surface formed on the opposite side surface to the housing; and an antenna connected to the waveguide circuit unit on the antenna mounting surface of the base plate.

In such a construction, the intermediate frequency electrical circuit unit is arranged inside the housing with one end surface in which an opening is formed. The base plate closes one end surface of the housing. The waveguide circuit unit and the high-frequency electrical circuit unit forming the transmitter/receiver function unit, together with the intermediate frequency electrical circuit unit, are mounted on the side surface of the base plate facing the housing. The antenna mounting surface is formed on the side opposite the housing. The antenna mounted on the antenna mounting surface of the base plate is connected to the waveguide circuit unit.

In this case, a through-opening corresponding to the waveguide is formed on the antenna mounting surface in the base plate, the through-opening acting as a device input/output portion.

The antenna mounting surface of the base plate may be formed as a device mounting fixture portion. This device mounting fixture unit allows the system to be mounted securely.

The housing may be formed as a synthetic resin housing and the device mounting fixture portion may be mounted on the antenna mounting surface of the base plate which covers the opening of the housing.

Furthermore, a display window may be formed on the end surface facing the end surface of the opening in the housing; and the housing may include a display unit for displaying through the display window. The display unit arranged inside the housing displays via the display window formed on the end surface facing the opening forming end surface of the housing.

BRIEF DESCRIPTION OF DRAWINGS

FIGS. 1 to 11 show an antenna integral-type transmitter/receiver system according to the first embodiment of the present invention.

FIG. 1 is a disassembled perspective view schematically illustrating the entire system configuration;

FIG. 2 is a plan view schematically illustrating the internal configuration;

FIG. 3 is a cross-sectional view schematically illustrating the configuration taken along the line 3—3 shown in FIG. 2;

FIG. 5 is a perspective view schematically illustrating the entire system to explain a conversion procedure of the vertical and horizontal polarized waves;

FIG. 7 is an electrical circuit diagram showing the configuration of the main electrical circuit unit;

FIG. 8 is a cross-sectional view schematically illustrating the first modified embodiment corresponding to FIG. 3;

FIG. 9 is a cross-sectional view schematically illustrating the second modified embodiment, corresponding to FIG. 3;

FIG. 10 is a cross-sectional view schematically illustrating the third modified embodiment, corresponding to the cross-sectional view taken along the line B—B shown in FIG. 2;

FIG. 11 is a cross-sectional view schematically illustrating the fourth modified embodiment, corresponding to FIG. 3;

FIG. 12 is a disassembled perspective view schematically illustrating the entire configuration of the antenna integral-type transmitter/receiver system, according to the second embodiment of the present invention;

Each of FIGS. 15 to 19 is used to explain an installation example of the antenna integral-type transmitter/receiver system according to the first embodiment of the present invention.

Figure 15:
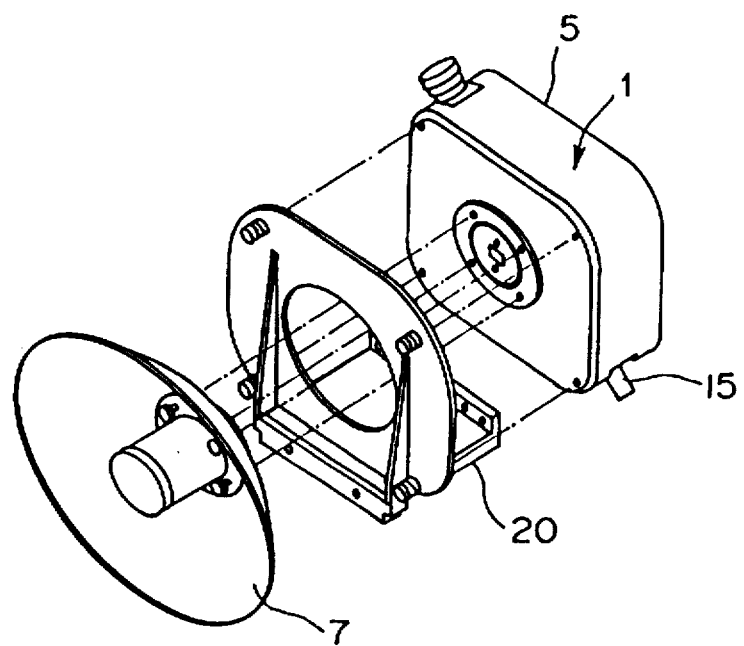
Figure 16:
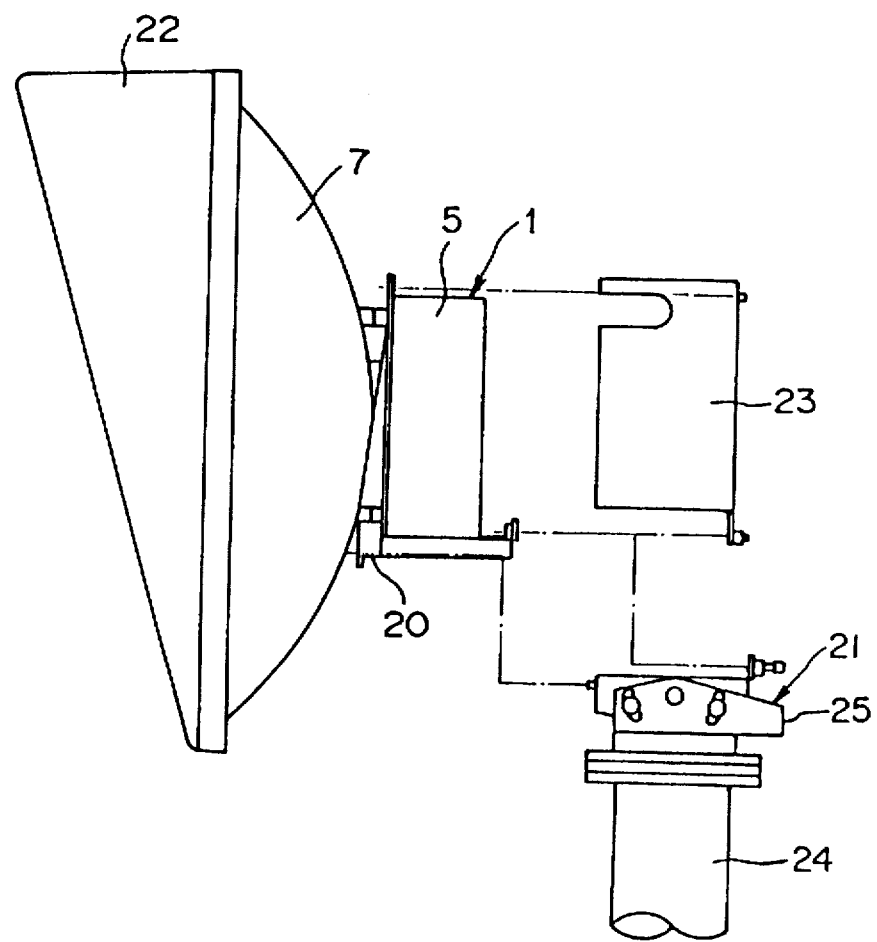
Figure 17:
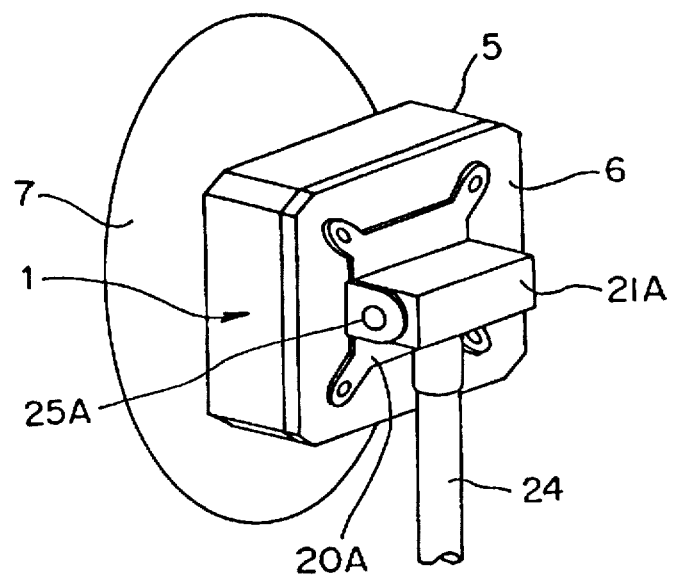
Figure 18A:
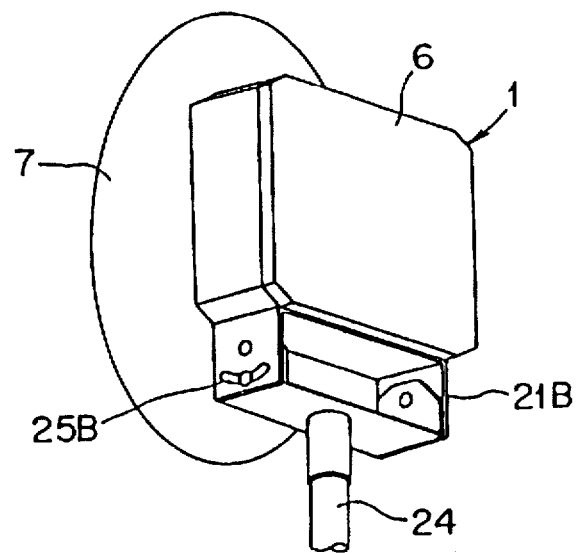
Figure 18B:
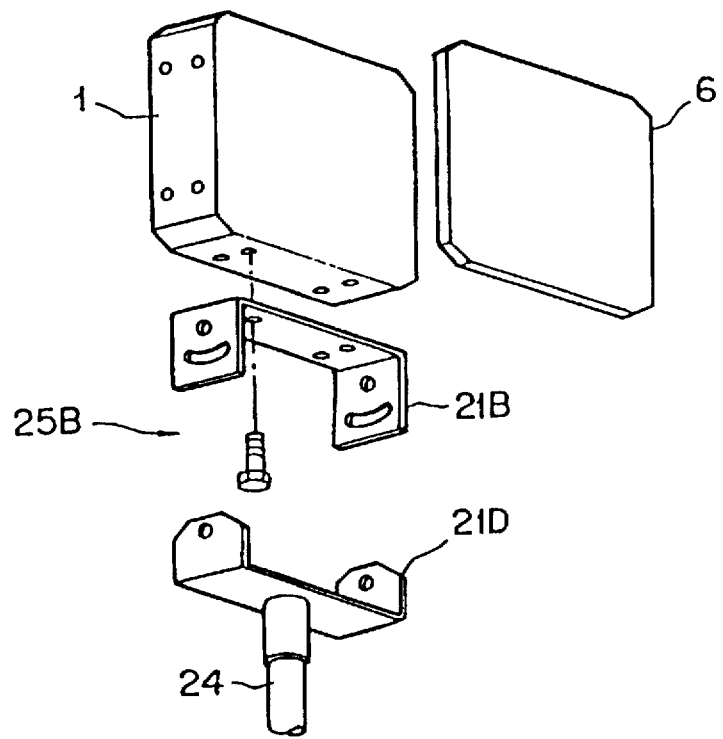
Figure 19:
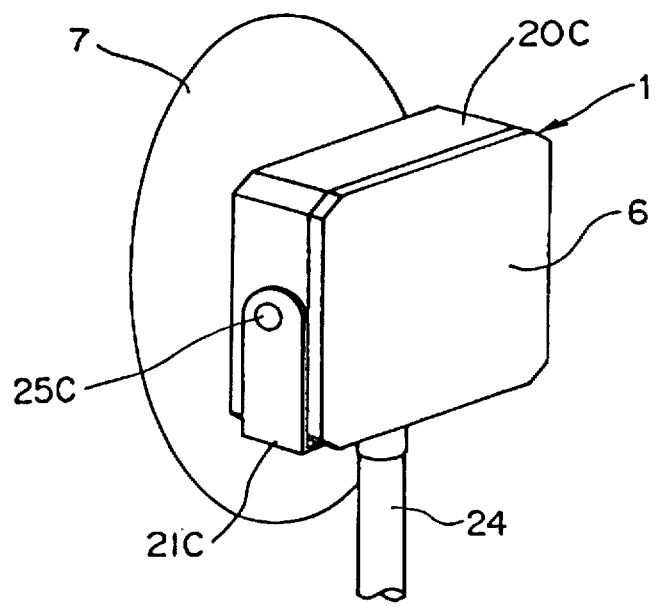

FIG. 15 is a disassembled perspective view used for explaining the first installation example;

FIG. 16 is a side view used for explaining the first installation example;

FIG. 17 is a perspective view used for explaining the second installation example;

FIG. 18(a) is a perspective view used for explaining the third installation example;

FIG. 18(b) is a disassembled perspective view used for explaining the structure of a fitment for the third installation example; and FIG. 19 is a perspective view used for explaining the fourth installation example.

Each of FIGS. 20 to 26 shows the antenna integral-type transmitter/receiver system according to the fifth embodiment of the present invention.

Figure 20:
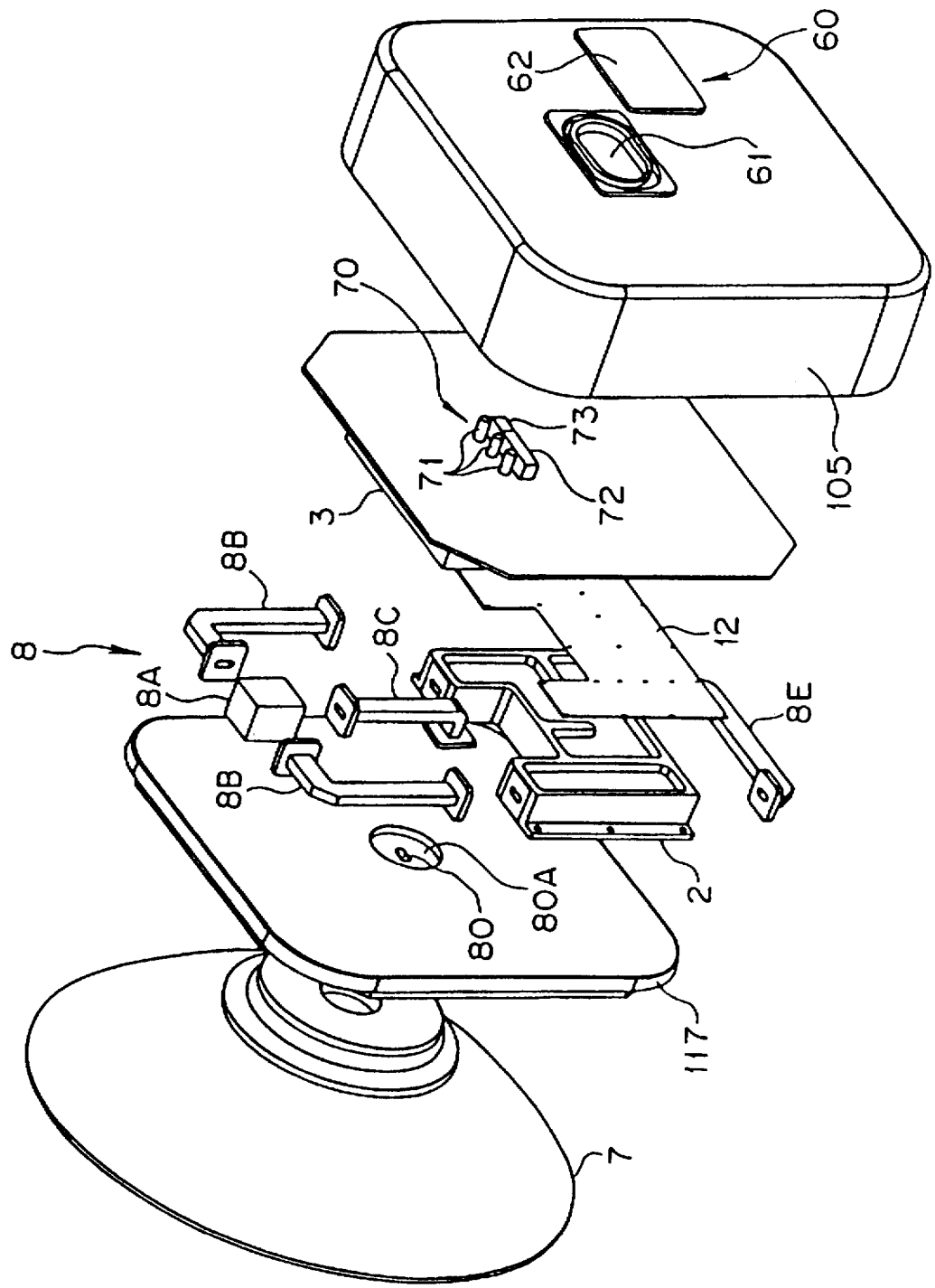
Figure 21:
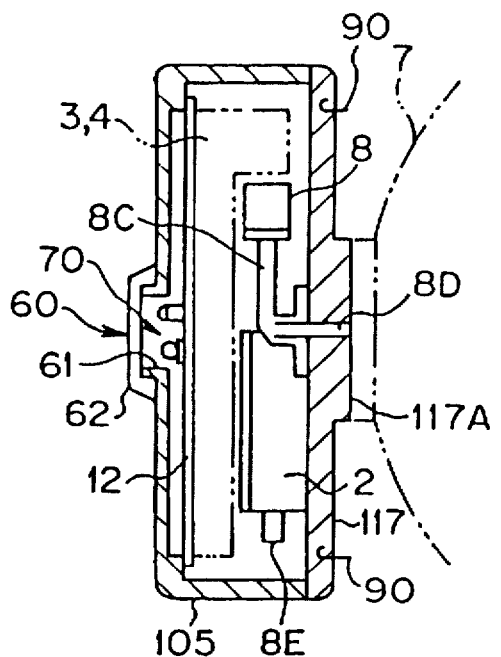
Figure 22:
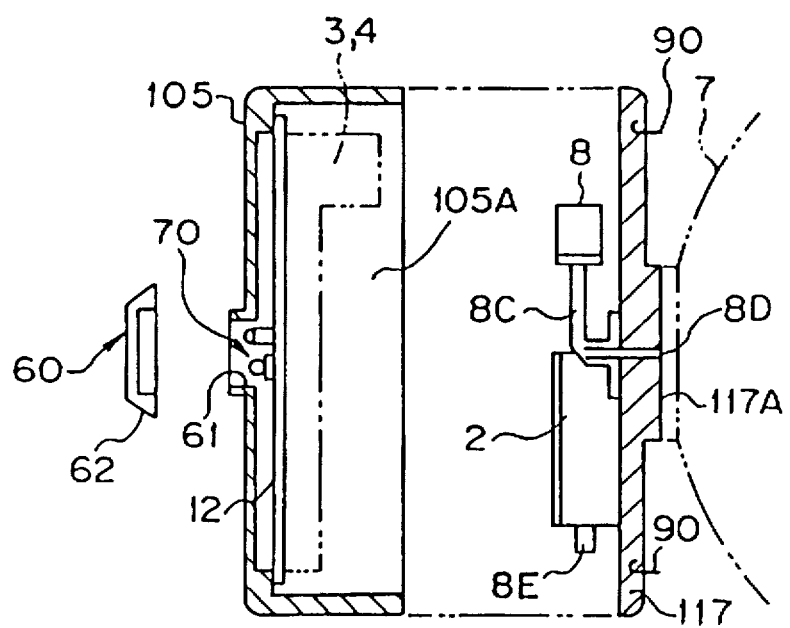
Figure 23:
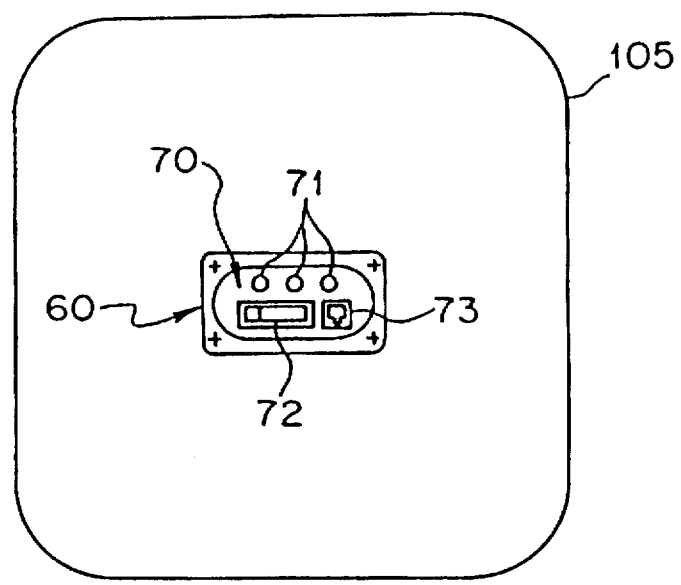
Figure 24:
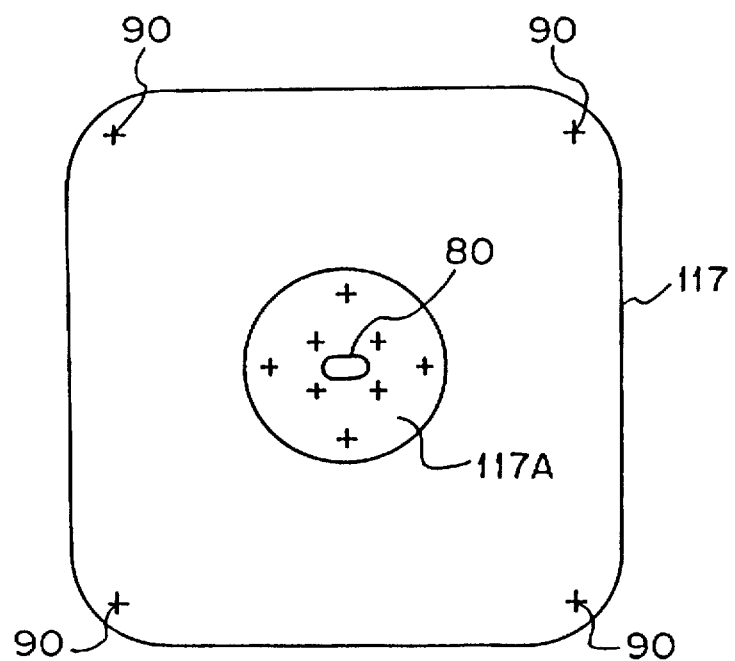
Figure 25:
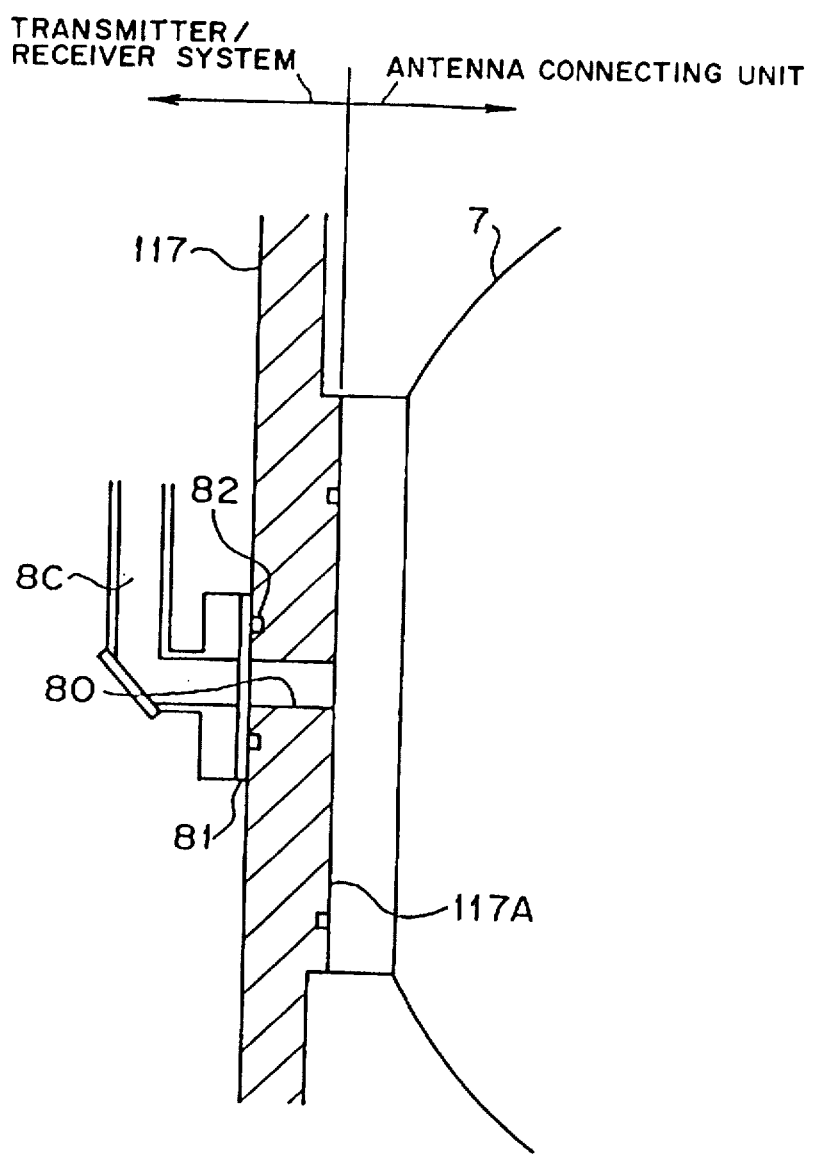
Figure 26:
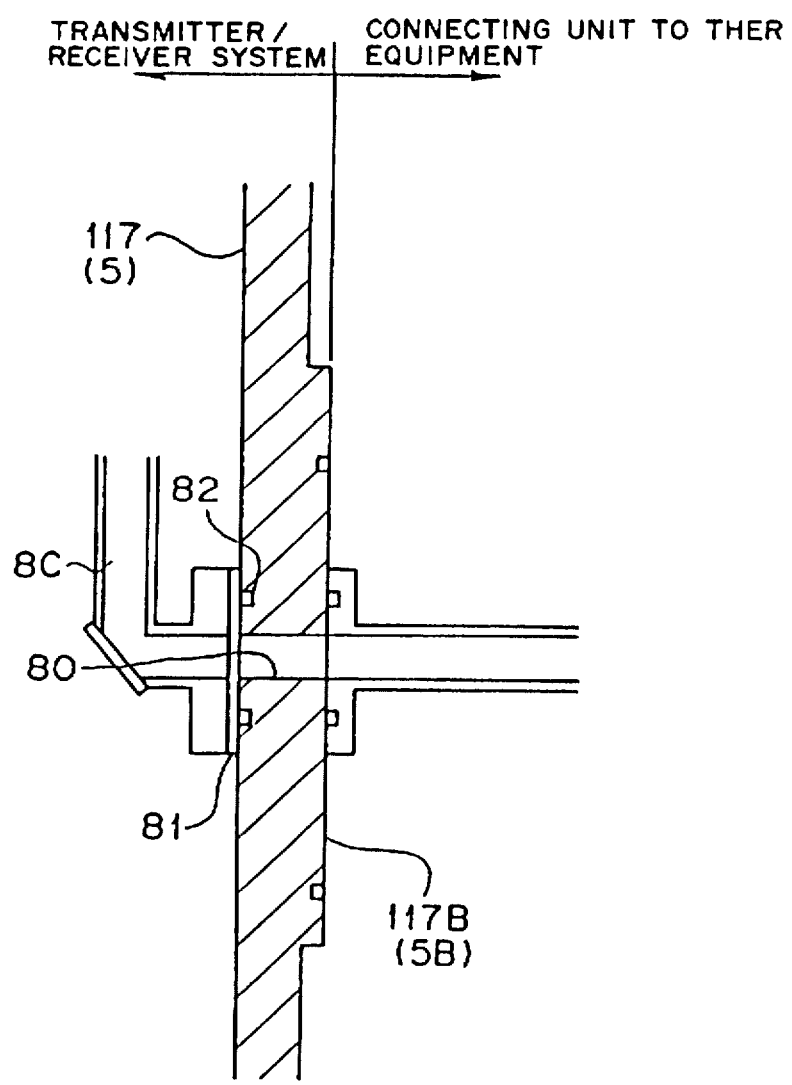
Figure 27:
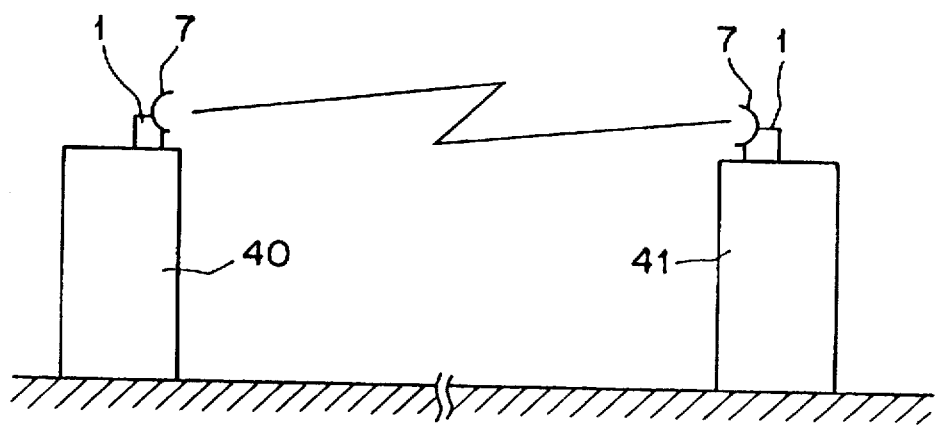
Figure 28:
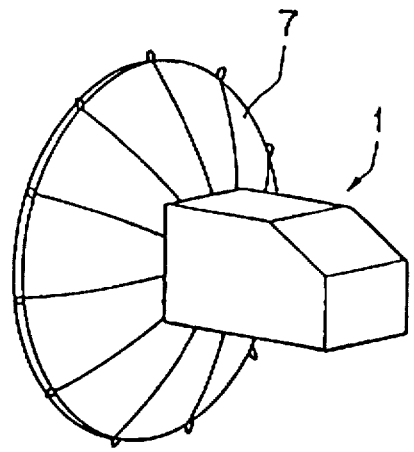
Figure 29:
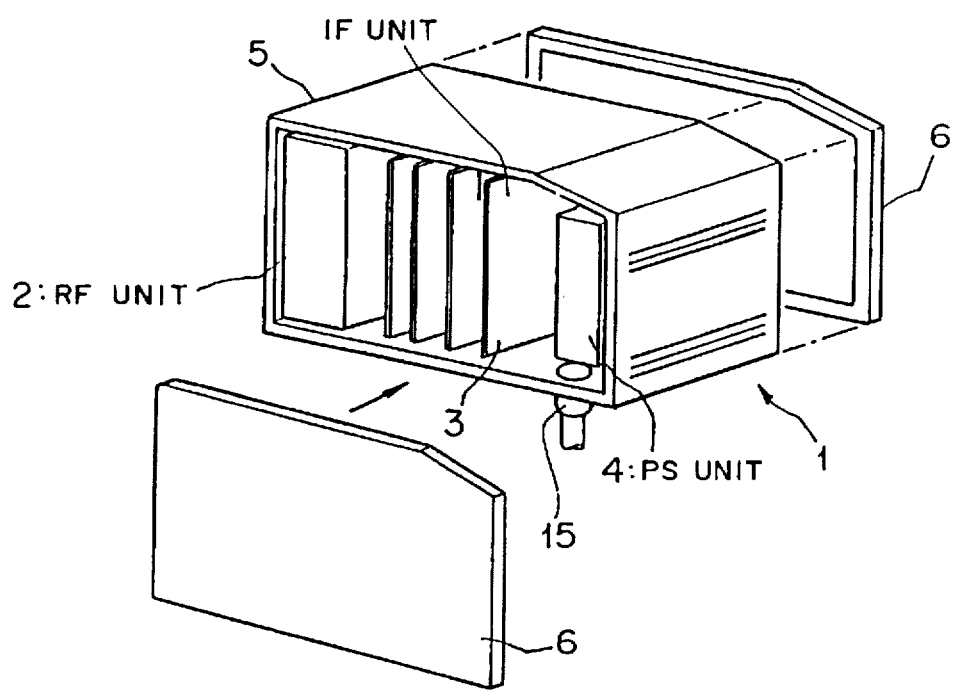
Figure 30:
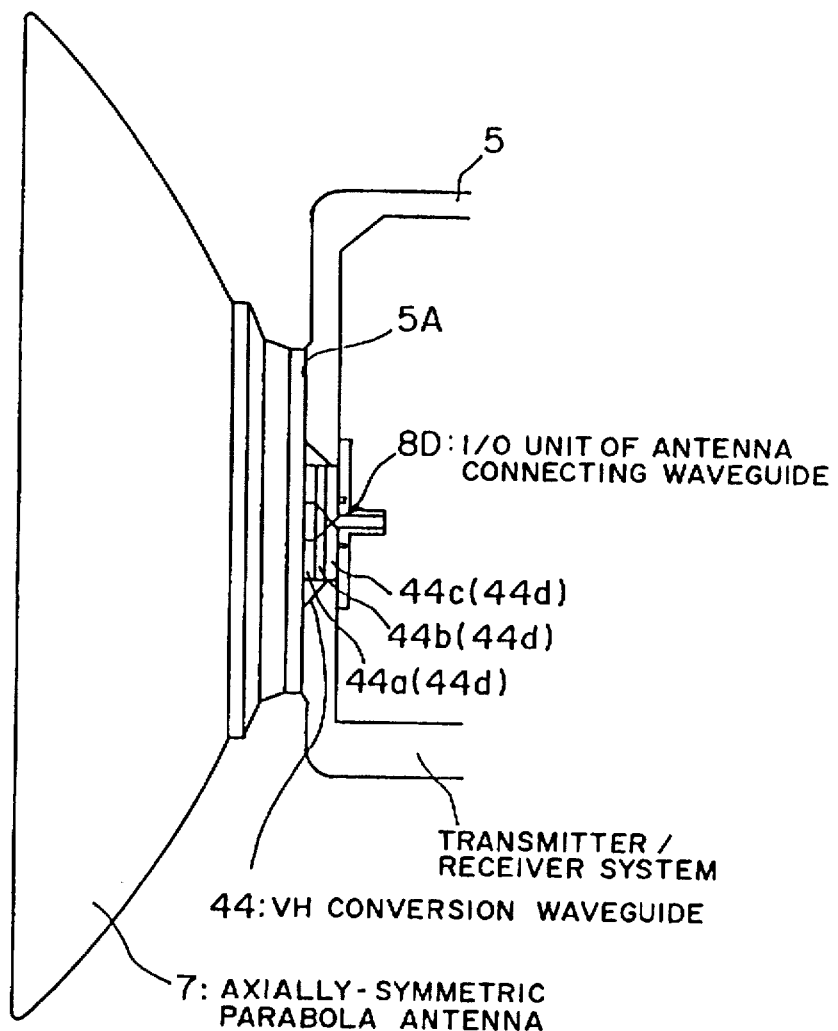
Figure 31:
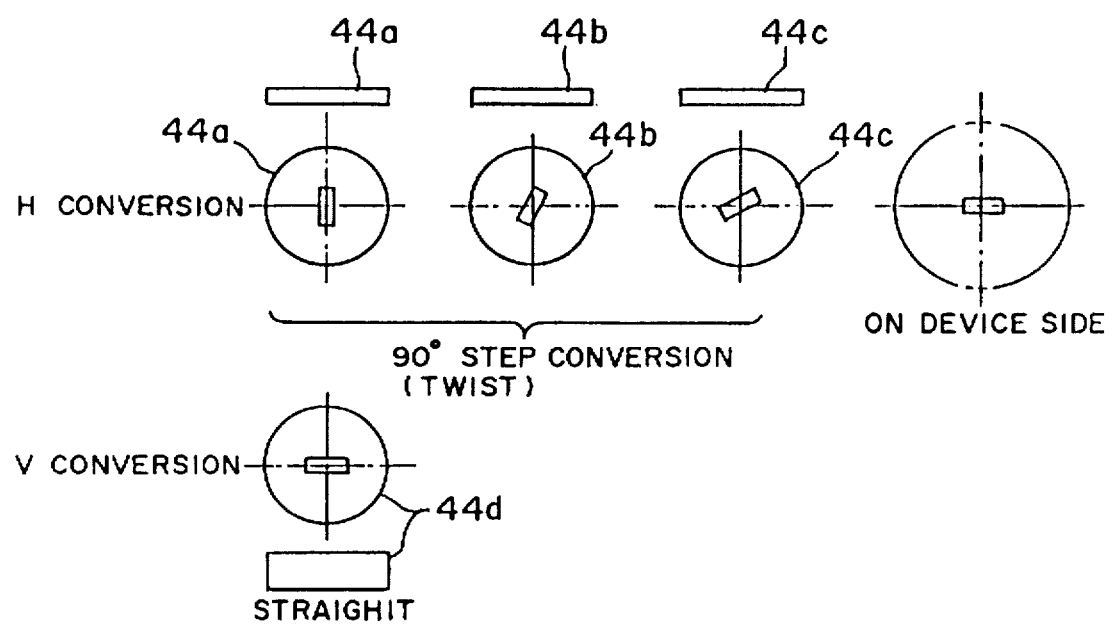

FIG. 20 is a disassembled perspective view schematically illustrating the entire configuration;

FIG. 21 is a cross-sectional view schematically illustrating the internal configuration;

FIG. 22 is a cross-sectional view schematically illustrating the internal configuration;

FIG. 23 is a front view illustrating the external appearance;

FIG. 24 is a rear view illustrating the external appearance;

FIG. 25 is a cross-sectional view partially illustrating the internal configuration;

FIG. 26 is a cross-sectional view partially illustrating the modified embodiment;

FIG. 27 is a schematic view of the antenna integral-type transmitter/receiver system in use;

FIG. 28 is a perspective view schematically illustrating the antenna integral-type transmitter/receiver system;

FIG. 29 is a disassembled perspective view schematically illustrating the internal configuration of the antenna integral-type transmitter/receiver system;

FIG. 30 is a cross-sectional view schematically illustrating the configuration of the antenna integral-type transmitter/receiver system; and FIG. 31 is a schematic diagram used for explaining the horizontal/vertical polarized conversion procedure in the antenna integral-type transmitter/receiver system.

Figure 1:
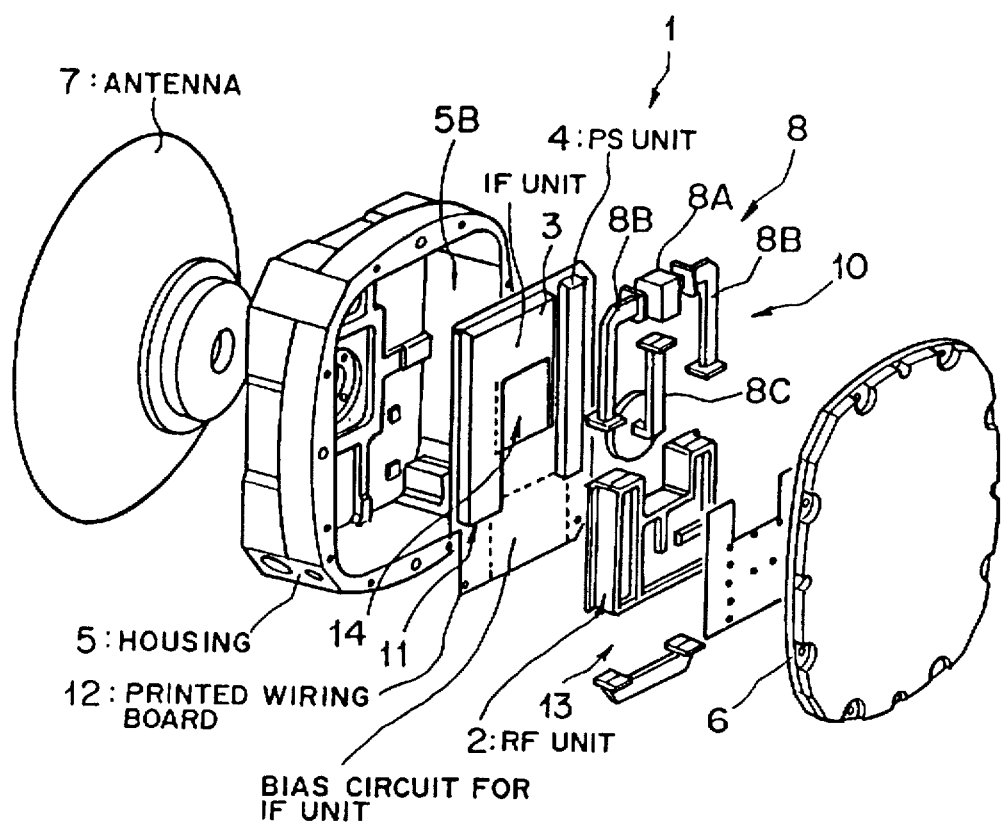

DETAILED DESCRIPTION OF THE PREFERRED EMBODIMENTS (a) Explanation of the first embodiment:

FIG. 1 is a disassembled perspective diagram showing schematically the entire structure of an antenna integral-type transmitter/receiver system according to the first embodiment of the present invention. As shown in FIG. 1, this system consists of a transmitter/receiver system body 1 and an antenna 7 integrally mounted to the transmitter/receiver system body 1. The transmitter/receiver system body 1 consists of a RF unit 2 acting as a high-frequency electrical circuit unit, an IF unit 3 acting as an intermediate frequency electrical circuit unit, a PS unit 4 acting as a power supply unit, a waveguide circuit unit 8, a case 5 acting as a housing, and a cover member 6.

The waveguide circuit unit 8 is formed of a circulator (CIR) 8A, a waveguide filter 8B, and an antenna connecting waveguide 8C. The RF unit 2, the IF unit 3, and the waveguide circuit unit 8 provide a transmitter/receiver function unit 13. The antenna 7 is connected to the transmitter/receiver function unit 13.

Figure 2:
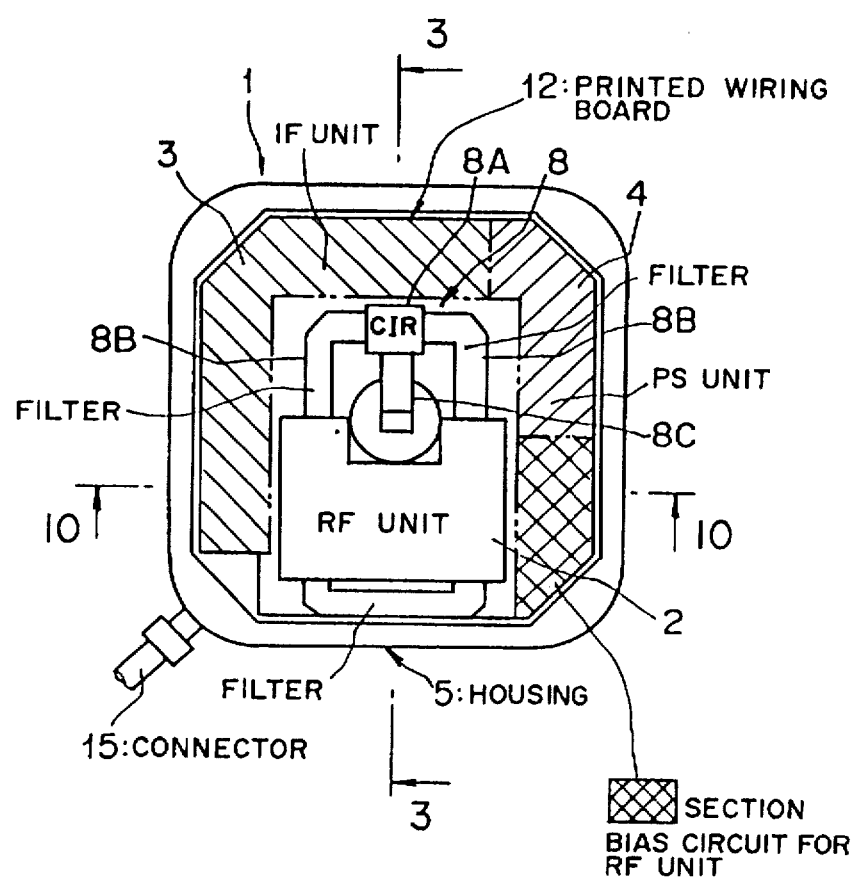
Figure 3:
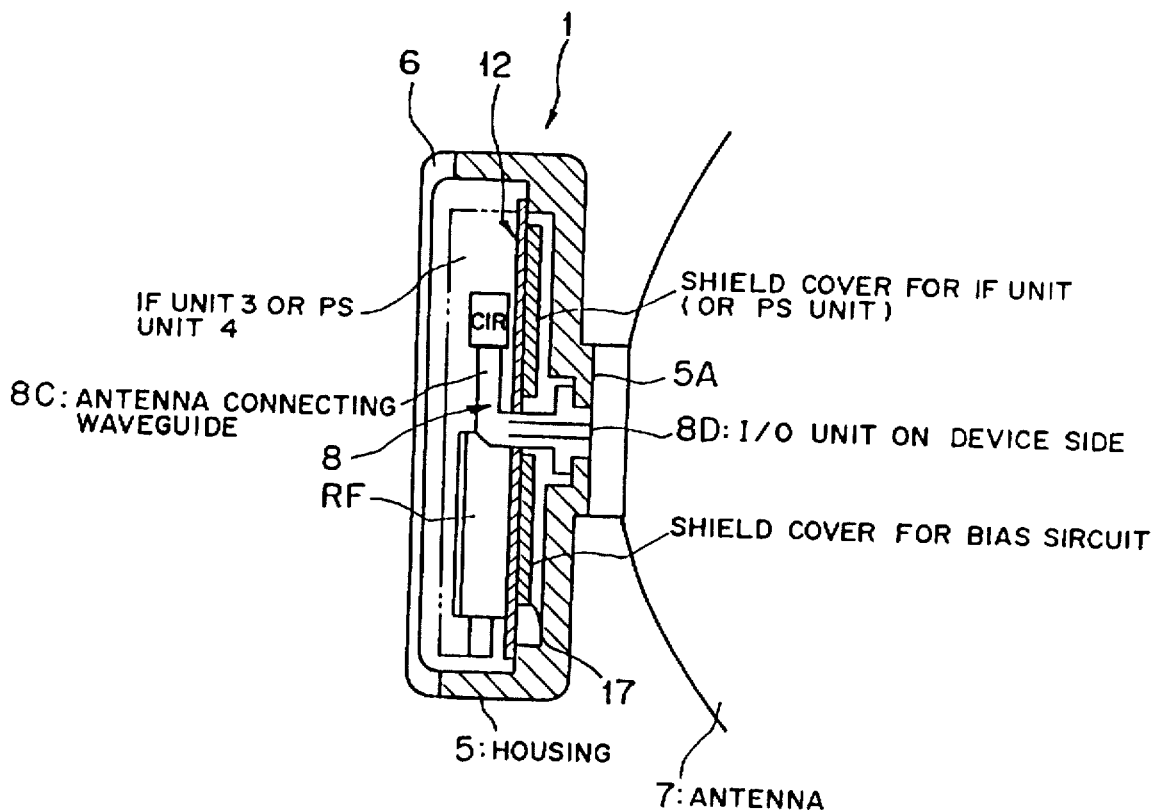

The case 5, as shown in FIG. 2, is formed nearly in a square, in the plan view. As shown in FIG. 3, an antenna mounting surface 5A is formed on one end surface of the case 5. An opening 5B is formed on the other end of the case 5. The RF unit 2, the IF unit 3, the PS unit 4, and the waveguide circuit unit 8 are housed within the case 5.

The waveguide circuit unit 8 and the RF unit 2 form the first unit 10. The IF unit 3 forms the second unit 11. As shown in FIGS. 1 and 3, the first unit 10 and the second unit 11 are arranged in a stacked form within the case 5 in the transmitter/receiver system body 1.

In the system body, the bias electrical circuit unit to be positioned on the back surface side of the RF unit 2 and the IF unit 3, and the PS unit 4 are integrally arranged on a single printed wiring board 12. That is, the electrical circuit units of the first unit 10 and the second unit 11 are arranged on the common printed wiring board 12. Conductors for the main electrical circuit units 2, 3, and 4 are put together on the single printed wiring board 12.

In this example, the condition in which the printed wiring board 12 and the waveguide circuit unit 8 are housed is shown in FIGS. 1 and 3. They are arranged within the case 5, in the order of the printed wiring board 12 and the waveguide circuit unit 8 from the side of the antenna mounting surface 5A of the case 5. The RF unit 2 is mounted under the waveguide circuit unit 8.

An opening 14 is formed in the middle portion of the printed wiring board 12. The waveguide circuit unit 8 is connected to the antenna 7 through the opening 14. Namely, a waveguide input/output unit 8D, as shown in FIG. 3, is formed at the end of the antenna connecting waveguide 8C of the waveguide circuit unit 8. The antenna 7 is connected to the waveguide input/output unit 8D through the opening 14.

In the system, as shown in FIGS. 1 and 2, the RF unit 2 and the waveguide circuit unit 8 are arranged around the waveguide input/output unit 8D being the center thereof, in the plan view. Moreover, the IF unit 3 and the PS unit 4 are arranged outside the above-mentioned parts. The IF unit 3 and the PS unit 4 have input/output connectors each connected with, for example, a cable.

The electrical circuit units of the first unit 10 and second unit 11 are arranged, if necessary, with metal shield covers covering the circuit components.

Figure 7:
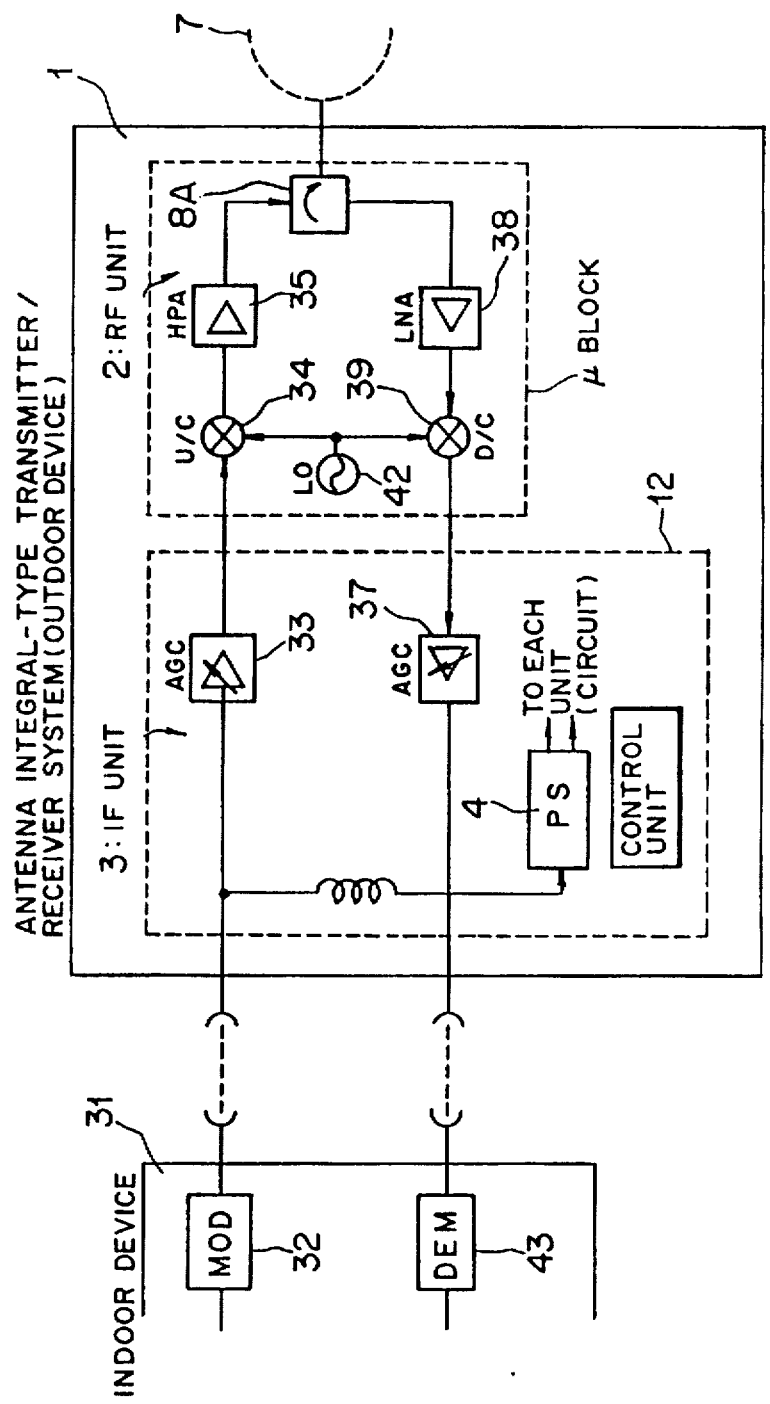

The electrical circuit configuration of each of the RF unit 2, the IF unit 3, and the PS unit 4 will be explained with, for example, FIG. 7.

The IF unit 3 includes the AGC (automatic gain control unit) 33 on the transmission side and the AGC 37 on the receiving side. The IF unit 3, the PS unit (power supply unit) 4, and a given control unit (including a bias electrical circuit unit for the RF unit 2) are arranged on the common printed wiring board 12.

The RF unit 2 consists of a U/C (up converter) 34, a HPA (high-power amplifier) 35, a circulator 8A, a LNA (low noise amplifier) 38, a D/C (down converter) 39, and a LO (local oscillator) 42. These elements are formed on the MIC (micro-IC) substrate and arranged in the housing for the RF unit 2. The electrical connection to the waveguide filter 8B is made by connecting a micro-strip line waveguide modulation circuit to the waveguide filter 8B. The space within the RF housing is electrically cut to prevent electrical interference between circuits.

Indoor equipment 31 is arranged separately to the transmitter/receiver system body 1. At a transmission time, the MOD (modulation unit) 32 on the side of the indoor equipment 31 modulates signals to input to the IF unit 3 on the side of the transmitter/receiver body 1.

The AGC 33 adjusts the gain of the signal and then the U/C 34 in the RF unit 2 converts the frequency of the IF signal into the submillimeter or millimeter band. The signal also is amplified by the HPA 35 and then transmitted from the antenna 7 via the circulator 8A.

The radio wave received by the antenna 7 is introduced to the IF unit 3 via the circulator 8A, the LNA 38, and the D/C 39. At this time, the D/C 39 converts the signal in the submillimeter or millimeter band into an IF signal.

The signal input to the IF unit 3 is gain-adjusted by the AGC 37 and then the resultant signal is input to the DEM (demodulation unit) 43 in the indoor equipment 31.

Figures 4A, 4B:
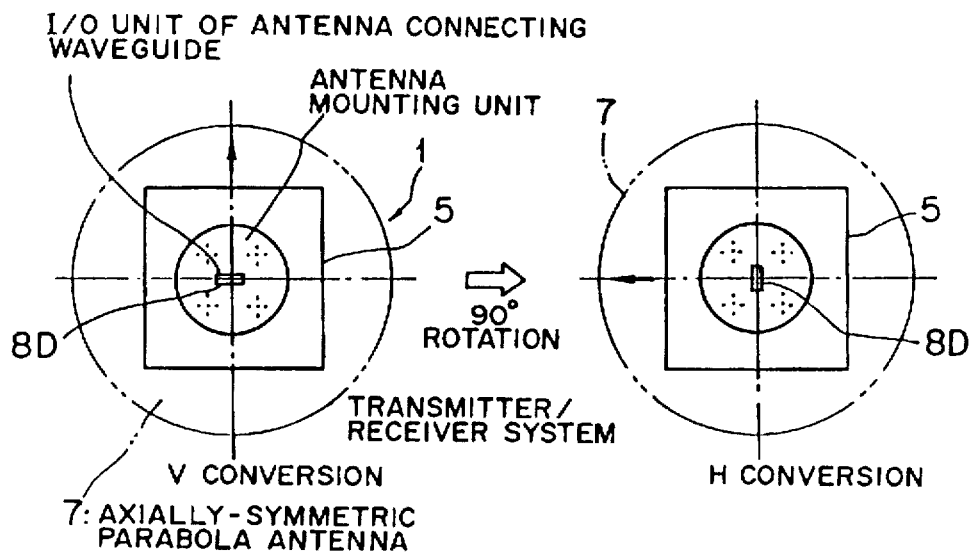
FIG. 4(a) is a schematic diagram used for explaining the vertical conversion procedure.
FIG. 4(b) is a schematic diagram used for explaining the horizontal conversion procedure.

In explanation of the external appearance of the entire system body, as described above, the case 5 is formed nearly in a square in the plan view. The external appearance does not change even if the entire system is rotated at 90° intervals with respect to the waveguide input/output unit 8D acting the center thereof. In other words, even if the entire system is arranged so as to receive a vertical polarized wave, as shown in FIG. 4(a) or a horizontal polarized wave, as shown in FIG. 4(b), the external appearance does not change. Namely, the horizontal/vertical polarized wave conversion, which is performed in the installation field to avoid interference between sets of adjacent equipment with the same frequency bands, can be simply performed by rotating the entire system at 90°.

Figure 5:
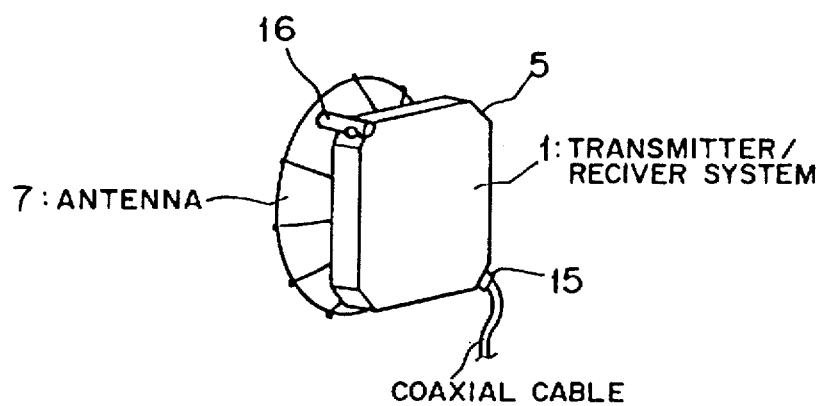
Figures 6A, 6B:
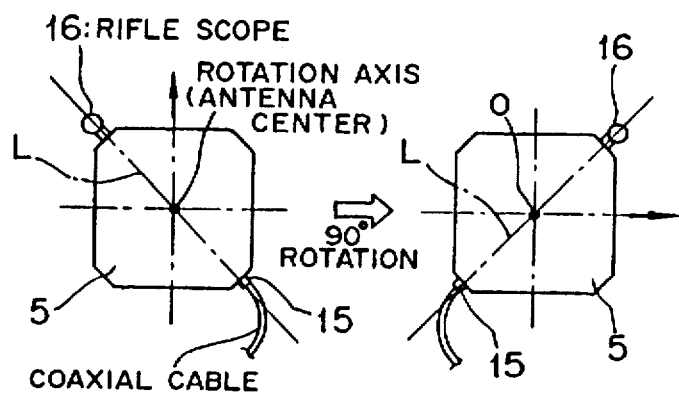
FIG. 6(a) is a schematic diagram used for explaining the vertical conversion procedure.
FIG. 6(b) is a schematic diagram used for explaining the horizontal conversion procedure.

On the other hand, as shown in FIGS. 2, 5, 6(a), and 6(b), an external interface connector 15 is connected to the system body. A rifle scope 16 acting as a positioning member is arranged as shown in FIGS. 5, 6(a), and 6(b). As shown in the figures, the rifle scope 16 and the connector 15 are arranged on the diagonal line L on the end surface of the case 5, coaxially around the mounting center portion O of the antenna 7.

Hence, as shown in FIGS. 6(a), and 6(b), the system body is equipped with the connector 15 arranged downward with respect to the right or left of the case 5 and the rifle scope 16 positioned over the case 5. As a result, even after the location of the system body 1, the horizontal/vertical conversion can be performed merely by rotating the system body 1 at only 90°.

The case 5 and the cover member 6 acting as a housing for the system body is made of a good conductive and heat-resistance member such as aluminum.

The antenna integral-type transmitter/receiver system according to the first embodiment of the invention has the above-mentioned structure. Hence the printed wiring board 12 can be integrated and the number of constructive components or electrical connecting parts can be reduced, so that the system can be compacted and thinned.

Since the electrical circuit units of the first unit 10 and the second unit 11 are arranged on the common printed wiring board 12, plane assembling is possible, thus remarkably improving the manufacturing ability and assembly ability.

FIG. 1 shows the configuration in which the waveguide filter 8B is used for the waveguide circuit portion 8. However, instead of the waveguide filter 8B, a dielectric filter can be used to simplify the configuration.

The conductors of the main electrical circuit units 2, 3, and 4 are integrally put together on the single printed wiring board 12 within the case 5. Thus it becomes easy to make the system external appearance be symmetrically to the vertical and horizontal directions with respect to the connecting portion as the center of the waveguide input/output unit 8D for the antenna 7. Hence, the horizontal/vertical polarized wave conversion can be simply established without changing the external appearance by rotating the entire system at 90° with the antenna 7 mounted, whereby the horizontal/vertical conversion waveguide is not needed. As a result, a small, slim, cost reduced system can be realized.

In the above-mentioned example, a rifle scope is explained as the positioning member 16. However, a maintenance spare connector, for example, may be used instead of the positioning member 16, without being restricted to the rifle scope.

A modified example of the first embodiment according to the present invention will be explained next.

Figure 8:
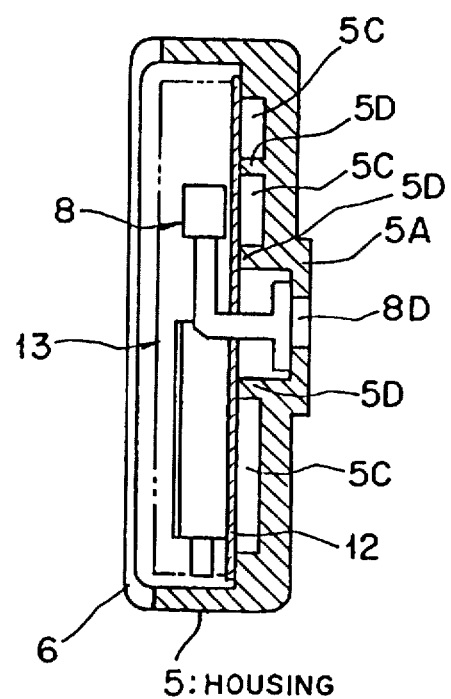

In an explanation of the first modified example, as shown in FIG. 8, a trench (or groove) 5C being a clearance for leads and assembling components on the printed wiring board 12 and the division portion 5D for avoiding interference between units in the printed wiring board 12 are formed on the fixing surface of the printed wiring board 12 within the case 5. The case 5 is formed as a shield cover, together with the trench 5C and the division portion 5D, so that no need of the shield cover allows the entire system to be small-sized and light-weighted.

Figure 9:
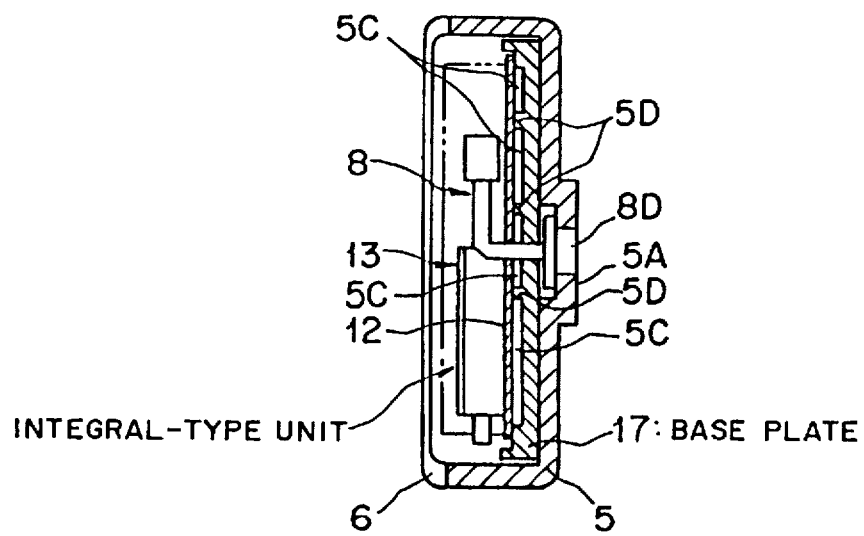

Next, in an explanation of the second modified embodiment, as shown in FIG. 9, a metal base member 17 is arranged between the case 5 and the printed wiring board 12. The trench (or groove) 5C and the division portion 5D are formed as a shield cover in the base member 17. In such a structure, even if a change in the performance specification or remodeling of the system results in a modification in electrical components for the printed wiring board 12 or replacing the printed wiring board 12 with a different one, a mere replacement of the base member 17 can deal with the modification.

Thus, there is an advantage in that a general-purpose case 5 can be used without subjecting the case 5 to any change. In other words, the specification change and remodeling can be quickly dealt at low cost.

Figure 10:
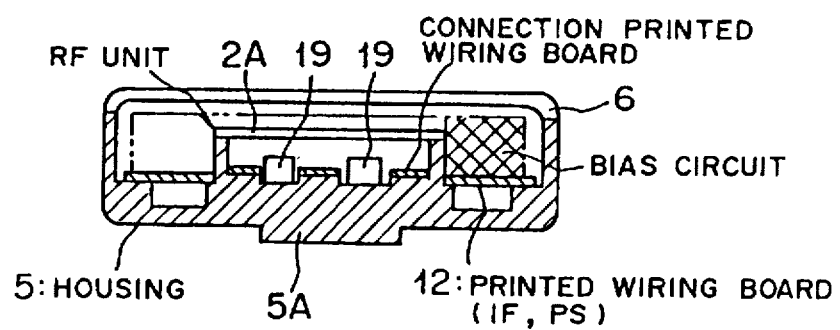

Next, in an explanation of the third modification, the case 5, the RF unit 2, and the housing unit 2A are integrally formed as shown in FIG. 10. The MIC 19 or similar things is arranged within the RF housing unit 2A.

The structure of the system enables the reduced number of components and improved assembling ability.

Figure 11:
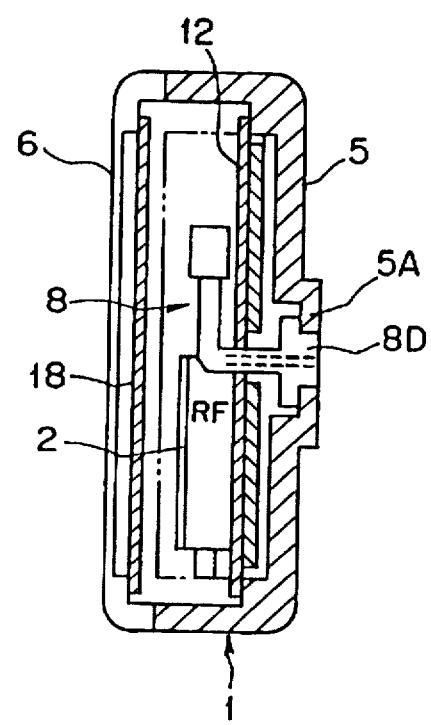

Next, the fourth modified embodiment will be explained below. As shown in FIG. 11, the sheet heater 18 is arranged inside the cover member 6 in the system body 1.

The sheet heater 18 can easily warm electrical components within the case 5. For example, the system can be installed outdoors in cold districts. Moreover, the system for a general specification can be changed into that for cold regions merely by arranging the sheet heater 18 on the cover member 6. Hence there is an advantage in that systems for different specifications can be manufactured at low cost.

The antenna integral-type transmitter/receiver system according to the present invention is mainly installed outdoors. The installation examples will be explained using FIGS. 15 to 19. FIGS. 15 and 16 are diagrams each showing the first installation example. In the first installation example, the device mounting fitment 20 is arranged between the housing 5 and the antenna 7 of the system body 1.

As shown in FIG. 16, the device support member 21 is arranged on the support 24 used to install the system body 1. The system can be arranged by mounting the device mounting fitment 20 on the device support member 21.

An attitude adjusting unit 25 is arranged to the device support member 21 to adjust the attitude of each of the antenna 7 and the system body 1. The attitude adjusting unit 25 can adjust vertically and horizontally the angle of the system. The horizontal direction of the system can be adjusted by rotating, for example, the support 24. Thus the antenna 7 and the system body 1 can be held in the attitude suitable for transmission and reception.

As shown in FIG. 16, a sunshade cover 23 is mounted on the housing 5 of the system body 1. An antenna cover 22 is mounted to the antenna 7. Where the system is used outdoors, the antenna cover 22 and the sunshade cover 23 protect the antenna 7 and the system body 1, respectively.

In the case of the system installation, the system body is mounted to the support 24 by using the device mounting fitment 20 and the device support member 21. After the support 24 is rotated at an angle suitable for the system installation, the attitude adjusting unit 25 adjusts the antenna 7 and the device body 1 to a desired attitude. Hence the system body can be installed over wide ranges without being restricted to a limited installation range.

With the system body miniaturized and slimmed, there is an advantage in that the system can be installed with the simplified support mechanism.

Next, the second installation example of the system body will be explained with FIG. 17. In this case, the system is installed by mounting the device mounting fitment 20A to the cover member 6 arranged on the back surface of the system body 1. Likewise, the attitude adjusting unit 25A is arranged to the system support member 21A, whereby the antenna 7 and the system body 1 can be adjusted in a desired attitude.

In the second installation example, the device mounting fitment 20A is mounted on the back surface of the system body 1. Thus there is an advantage in that the system body can be easily installed.

Next, the third installation example of the system body will be explained. In this installation example, as shown in FIGS. 18(a) and 18(b), the nearly U-shaped fitments 21B and 21D are arranged on the lower surface of the housing 5 so as to face to each other. As shown in the figures, fitments 21B and 21D are connected via a pin pivotablly or rotatably.

The attitude adjusting unit 25B is formed with the pin connecting unit. The attitudes of the antenna 7 and the system body 1 can be adjusted by bonding the fitment 21B to the lower surface of the housing 5 with volts or the like. In such a system installation, the system can be installed in such a way that other device mounting fitments and device support member do not protrude toward the cover member 6 on the back surface of the system body.

As shown in FIG. 18(b), the fitment 21B is bonded with the side surface of the case 5 of the system, by forming the metal fitting bolt holes in the side surface. Thus the vertical/horizontal polarized wave conversion is performed according to the condition of the system installation.

As described above, in the third installation example, since any mounting members are not arranged on the back surface of the system body 1, the system can be installed without occupying the place in the deep direction. Hence there is an advantage in that the system body can be installed in a narrow space and the vertical/horizontal polarized wave conversion can be simplified.

Finally, the fourth installation example of the system body will be explained as shown in FIG. 19. In this installation example, like the third installation example, the device mounting fitment 20C is formed so as to cover the side surface of the housing 5. The device mounting fitment 20C and the device support member 21C are rotatably connected to the side surface of the housing 5. The angles in the vertical direction can be adjusted with respect to the connection portion being the center thereof.

As described above, there is an advantage in that the system body can be installed without occupying the place in the deep direction, and installed vertically in a compact form.

In either installation example described above, downsizing and slimming the system allows the system installation using a simpler support mechanism.

The attitude adjusting unit 25, 25A to 25C can be rotatably formed with respect to two axis directions including the center axis of the support 24 and the axis perpendicular to the center axis. Even when the support member 24 is fixed, the attitude of the antenna 7 can be easily adjusted after an installation of the system.

The installation of the system should not be limited to the first to fourth installation examples. The system is widely applicable to other installation examples.

(b) Explanation of the second embodiment:

Next, explanation will be made as to the antenna integral-type transmitter/receiver system according to the second embodiment of the present invention. FIG. 12 is a disassembled perspective view showing schematically the entire structure of the antenna integral-type transmitter/receiver system.

As shown in FIG. 12, in the second embodiment, contrary to the configuration of the first embodiment, the waveguide circuit unit 8 and the printed wiring board 12 are arranged in the case 5 in the order of the waveguide circuit unit 8 and the printed wiring board 12 from the mounting surface 5A of the antenna 7 on the case 5. In other words, the elements are housed in the reverse order to that in the first embodiment. Other elements are substantially similar to those in the first embodiment.

That is, the waveguide circuit unit 8 is constituted of a circulator (CIR) 8A, a waveguide filter 8B, and an antenna coupling waveguide 8C. The transmit/receive function unit 13 is formed of the RF unit 2, the IF unit 3, and the waveguide circuit unit 8. The antenna 7 is connected to the transmit/receive function unit 13.

The opening 5B is formed in the other end surface of the case 5. The case 5 houses the RF unit 2, the IF unit 3, the PS unit 4, and the waveguide circuit portion 8.

The waveguide circuit unit 8 and the RF unit 2 provides the first unit 10. The IF unit 3 provides the second unit 11. As shown in FIG. 12, the first unit 10 and the second unit 11 are arranged in a stacked form in the case 5 of the transmitter/receiver system body 1.

As shown in FIG. 12, the direction of the RF unit 2 arranged to the case 5 is the same as that in the first embodiment. The printed wiring board 12 is arranged in a stacked form on the side of the cover member 6 of the RF unit 2.

The IF unit 3 and the PS unit 4 (and, if necessary, the bias electrical circuit portion of the RF unit 2) are integrally arranged on the single printed wiring board 12. The electrical circuit units in the first unit 10 and the second unit 11 are arranged on the common printed wiring board 12. The conductors for the main electrical circuit portions 2, 3, and 4 are summed up.

As described above, since the printed wiring board 12 is housed in the back side of the mounting surface 5A of the antenna 7, the opening 14, described with the first embodiment, is not formed in the middle of the printed wiring board 12. The waveguide circuit portion 8 is connected directly to the antenna 7.

The antenna integral-type transmitter/receiver system according to the second embodiment of the present invention has the above-mentioned structure. Hence the effect substantially identical to that of the first embodiment can be obtained. Since the opening 14 which is formed in the middle portion of the printed wiring board 12 to connect the waveguide circuit portion 8 with the antenna 7 is not needed, the printed wiring board 12 can be effectively utilized. Moreover, since the waveguide circuit unit 8 does not penetrate the printed wiring board 12, there is an advantage in that the freedom in size of the height of each of the IF unit 3 and the PS unit 4 increases.

The second embodiment may be constituted as the first to fourth modifications of the first embodiment.

It may be considered that the case 5, the RF unit 2, and the housing unit 2A are integrated and the MIC 19 is arranged inside the RF housing unit 2A. The sheet heater 18 may be arranged inside the cover member 6 of the system body 1.

The antenna integral-type transmitter/receiver system of the second embodiment can be arranged as that of the first embodiment (refer to FIGS. 15 to 19).

Figure 13:
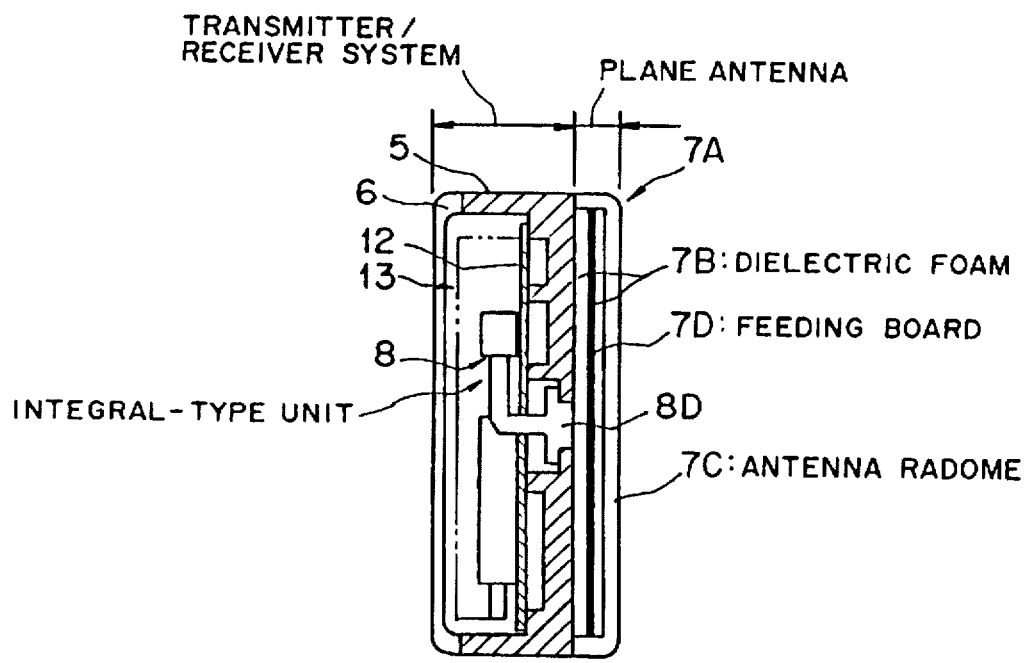
FIG. 13 is a cross-sectional view schematically illustrating the internal configuration of the antenna integral-type receiver/transmitter system according to the third embodiment of the present invention, corresponding to FIG. 3.

(c) Explanation of the third embodiment:

Next, the antenna integral-type transmitter/receiver system according to the third embodiment of the present invention will be explained. FIG. 13 is a cross-sectional view showing schematically the internal structure and corresponds to FIG. 3.

In the third embodiment, only the structure of the antenna 7 is different from those in the first and second embodiments. As shown in FIG. 13, in this example, the plane antenna 7A is mounted in place of the conventional antenna 7.

In the plane antenna 7A, the feeder substrate 7D is sandwiched in the foam dielectric 7B. The antenna radome 7C covers the foam dielectric 7B and the feeder substrate 7D. The plane antenna 7A is mounted on the antenna mounting surface 5A of the case 5.

The antenna mounting surface 5A of the case 5 acts as the ground conductor for the plane antenna 7A. Hence the antenna mounting surface 5A is made of aluminum or similar material. The antenna mounting surface 5A is used as a base plate to satisfy the strength of the plane antenna 7A.

The plane antenna 7A may have either structure shown in the first or second embodiments. The juncture for coupling between the antenna 7A and the transmit/receive function unit 13 may be positioned at a place other than the center of the system body 1.

Since the antenna integral-type transmitter/receiver system according to the third embodiment of the present invention is constituted as the above-mentioned plane antenna integral-type transmitter/receiver system, the effect similar to those of the first and second embodiments can be obtained. Moreover, a slimmer transmitter/receiver system can be manufactured at low cost. Moreover there is an advantage in that the entire system has a good external appearance.

The antenna integral-type transmitter/receiver system according to the third embodiment can be installed as seen in the first embodiment (refer to FIGS. 15 to 19).

Figure 14:
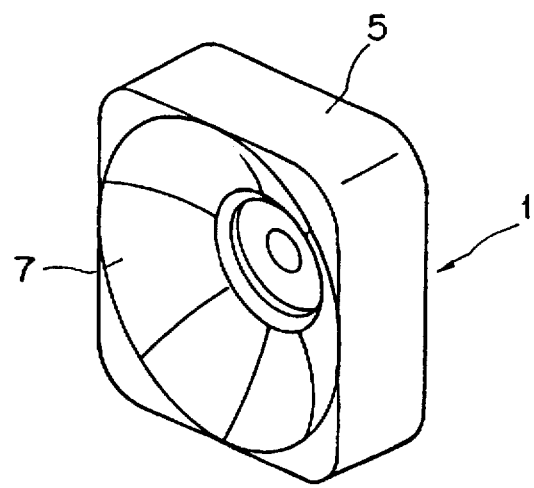
FIG. 14 is a perspective view schematically illustrating the entire configuration of the antenna integral-type receiver/transmitter system according to the fourth embodiment of the present invention.

(d) Explanation of the fourth embodiment:

Next, the antenna integral-type transmitter/receiver system according to the fourth embodiment of the present invention will be explained. FIG. 14 is a perspective view showing schematically the entire configuration.

In the present embodiment, as shown in FIG. 14, a surface of the case 5 acting as a housing is formed as the main reflector of the antenna 7. Namely, the case 5 itself acts as a parabola antenna 7.

The interior of the system is constituted as explained with the first and second embodiments.

The antenna integral-type transmitter/receiver system according to the fourth embodiment of the present invention is constituted like the above-mentioned structure. Hence the effect substantially similar to those of the first and second embodiments can be obtained and the system can be miniaturized and slimmed so that the number of the components can be reduced.

The antenna integral-type transmitter/receiver system according to the fourth embodiment can be installed as seen in the first embodiment (refer to FIGS. 17 to 19).

(e) Explanation of the fifth embodiment:

Next, the antenna integral-type transmitter/receiver system according to the fifth embodiment of the present invention will be explained. FIG. 20 is a disassembled perspective view showing schematically the entire configuration. FIGS. 21 and 22 are cross-sectional views each showing schematically the internal constructions. FIG. 23 is a front view showing the external appearance. FIG. 24 is a rear view showing the external appearance. FIG. 25 is a partial cross-sectional view showing the external appearance.

In the fifth embodiment, as shown in FIG. 22, the IF unit (intermediate frequency electrical circuit unit) 3 is included inside the case (housing) 105 with one end surface opened. The base plate 117 is arranged so as to face the opening 105A of the case 105. The end surface of the case 105 is closed. Thus an antenna integral-type transmitter/receiver system is constituted.

The waveguide circuit unit 8 and the RF unit (high-frequency electrical circuit portion) 2 are mounted on the side surface of the case 105 of the base plate 117. The opposite side surface of the case 105 of the base plate 117 is formed as the antenna mounting surface 117A. Like the IF unit 3, the PS unit 4 is arranged inside the case 105.

Hence, in the antenna integral-type transmitter/receiver system according to the present embodiment, as shown in FIG. 22, the IF unit 3, the waveguide circuit unit 8, and the RF unit 2 are exposed by separating the case 105 from the base plate 117. The band splitting filters 8B and 8E can be easily exchanged without detaching the assembled units 2, 3, and 8 from the case 105, so that maintenance and inspection can be simply performed. The case 105 is formed of a synthetic resin material such as FRP.

As shown in FIGS. 24 and 25, the through-hole portion 80 corresponding to a waveguide is formed in the antenna mounting surface 117A of the base plate 117. The through-hole portion 80 is used as the input/output unit on the side of the equipment (or antenna interface unit).

That is, as shown in FIG. 25, the waveguide 8C is connected to the antenna 7 through the through-hole 80. The packing member 82 such as a hermetic window 81, e.g. mica, and an O-ring is arranged between the base plate 117 and the waveguide 8C. As shown in FIG. 20, in fact, the recess portion 80A is formed around the through-hole portion 80 of the base plate 117.

As shown in FIGS. 20 to 23, the display window 60 is formed in the closed surface of the case 105 of the system. The display window 60 is formed by arranging an opening 61 for the display window in a part of the closed surface of the case 105 and covering the opening 61 with the transparent member 62 such as transparent acrylic material or glass. This display window 60 allows the display content of the display unit 70 included in the case 105 to be confirmed.

The display unit 70, as shown in FIGS. 20 and 23, which consists of the LED 71, the level meter 72, and the check terminal 73 displays the receiving sensitivity and the device operational condition.

As shown in FIG. 24, the antenna mounting surface 117A on the base plate 117 is formed as the device mounting fixture 90. The device mounting fixture 90 is a member used to mount the system fixed and used indoors and outdoors. Even if the stiffness of the case 105 is designed low, sufficient durability can be realized by arranging the fixture 90 to the base plate 117.

The structure (refer to FIGS. 24 and 25) including the through-hole 80 corresponding to the waveguide formed in the antenna mounting surface 117A of the base plate 117 and antenna 7 connected to the waveguide 8C via the through-hole 80 is applicable to the first to fourth embodiments.

In the antenna integral-type transmitter/receiver system according to the fifth embodiment of the present invention, as described above, the IF unit 3 and the PS unit 4 are included on the side of the case 105 and the waveguide circuit portion 8 and the RF unit 2 are mounted on the side surface of the case 105 of the base plate 117 used to close the case 105. Thus the IF unit 3, the waveguide circuit unit 8 and the RF unit 2 can be separated from the side of the case 105 and the side of the base plate 117. These units can be assembled and adjusted in different steps.

That is, at the time of the specification modification of the system, particularly, the exchange of the band splitting filters 8B and 8E associated with frequency changes, it is unnecessary to disassemble all assembled units. As a result, the number of steps needed to the specification modification can be reduced.

The case 105 is required only to have as degree as the strength with which the IF unit 3 and the PS unit 4 can be held, by mounting the device fixture 90 on the side of the antenna mounting surface 117A of the base plate 117. Hence, it is possible to use a synthetic resin material such as FRP so that the system can be made in lightweight and at low cost.

The specially-shaped flange and the hermetic window flange for fixing the base plate 117 (corresponding to the case 5 in other embodiments) are not needed by forming the through-hole 80 corresponding to the waveguide in the antenna mounting surface 117A and using the through-hole 80 as the input/output unit 8D on the system side. Thus the low manufacturing cost and improved assembling capability can be established.

Moreover, conventionally, unless components such as the RF unit 2, the IF unit 3, and the PS unit 4 are prepared, the system assembly work cannot be made progress. However, according to the present system, the assembling work advances in parallel on the side of the case 105 and the side of the base plate 117, whereby the work efficiency can be improved.

The structure which includes the display window 60 formed in the end surface facing the opening 105A of the case 105 and the display unit 70 included within the case 105 to display through the display window 60 allows the system body to have the necessary display functions (the signal receiving level display, a transmission output level, and the confirmation display for a primary power supply or the like needed in an antenna direction adjusting operation at the time of the installation of a transmitter and receiver unit or a periodical maintenance work). Thus it is possible to remove the exclusive external display.

(f) Others:

As shown in FIG. 26, the external side surface 117B or 5B in the base plate 117 or the case 5 may be formed as coupling surface to other devices. The waveguide 8C may be connected to other devices through the through-hole 80.

In this case, the internal structure of the device (the left side to the base plate 117 in the figure) viewed from the through-hole 80 is not shown particularly. However, the system may have the internal structure shown in any one of the first to fifth embodiments.

That is, as shown in FIG. 1, in the internal structure, the first unit 10 having the waveguide circuit portion 8 and the RF unit 2 and the second unit 11 having the IF unit 3 are arranged in a stacked form within the housing 5, or the printed wiring board 12 and the waveguide circuit portion 8 each having the electrical circuit portions of the first unit 10 and the second unit 11 are arranged in the housing in order of either the printed wiring board 12 and the waveguide circuit portion 8 or the waveguide circuit portion 8 and the printed wiring board 12. As shown in FIGS. 20 to 22, the structure may include the waveguide circuit unit 8 and the RF unit 2 arranged on the base plate 117, in addition to the IF unit 3 included in the case 105.

INDUSTRIAL APPLICABILITY

As described above, the antenna integral-type transmitter/receiver system according to the present invention is useful as a small, lightweight antenna integral-type transmitter/receiver system, and suitable mainly for an antenna integral-type transmitter/receiver system installed outdoors.

We claim:

1. An antenna integral-type transmitter/receiver system comprising:

a housing (5) having one end surface in which an opening (5B) is formed and the other end surface in which an antenna mounting surface (5A) is formed, and including a transmitter/receiver function unit (13) formed of a waveguide circuit unit (8), a high-frequency electrical circuit unit (2), and an intermediate electrical circuit unit (3) inside the housing;

an antenna (7) connected to said transmitter/receiver function unit (13) mounted on the other end surface of said housing (5); and a cover member (6) for closing the opening (5B) of the one end surface of said housing (5);

said waveguide circuit unit (8) and said high-frequency electrical circuit unit (2) forming a first unit (10), said intermediate electrical circuit unit (3) forming a second unit (11), said first unit (10) and said second unit (11) being arranged so as to be stacked in said housing (5), wherein the electrical circuit unit in each of said first unit (10) and said second unit (11) is arranged on a common printed wiring board (12).

2. The antenna integral-type transmitter/receiver system according to claim 1, wherein said printed wiring board (12) and said waveguide circuit unit (8) are arranged in said housing in the order of said printed wiring board (12) and said waveguide circuit unit (8), and wherein said waveguide circuit unit (8) is connected to said antenna (7) via said opening (14) formed in the middle portion of said printed wiring board (12).

3. The antenna integral-type transmitter/receiver system according to claim 1, wherein said waveguide circuit unit (8) and said printed wiring board (12) are arranged in said housing (5) in the order of said waveguide circuit unit (8) and said printed wiring board (12).

4. The antenna integral-type transmitter/receiver system according to any one of claims 1, 2 or 3, wherein said high-frequency electrical circuit unit (2) and said waveguide circuit unit (8) are arranged coaxially around a waveguide input/output unit (8D) connected to said antenna (7) in said waveguide circuit unit (8) and wherein said intermediate frequency electrical circuit unit (3) and power supply unit (4) are arranged outside said high-frequency electrical circuit unit (2) and said waveguide circuit unit (8).

5. The antenna integral-type transmitter/receiver system according to claim 1, wherein said housing (5) has its vertically and horizontally symmetrical outline and can be rotated at 90° to perform a horizontal/vertical conversion while the housing (5) is attached with said antenna (7).

6. The antenna integral-type transmitter/receiver system according to claim 1, further comprising a shield cover formed on the fixture surface of said printed wiring board (12) in said housing (5), said shield cover having a trench, groove (5C), or separation unit (5D) to relieve parts or leads assembled on said printed wiring board (12).

7. The antenna integral-type transmitter/receiver system according to claim 1, wherein said printed wiring board (12) is assembled inside said housing (5) via a base member (17).

8. The antenna integral-type transmitter/receiver system according to claim 7, wherein said base member (17) has a trench, groove (5C), or separation unit (5D) which relieves parts or leads assembled on said printed wiring board (12), said base member (17) acting as a shield cover.

9. The antenna integral-type transmitter/receiver system according to claim 1, wherein the antenna mounting surface (5A) of said housing (5) is used as a ground conductor and a base plate for a plane antenna (7A).

10. The antenna integral-type transmitter/receiver system according to claim 1, wherein said antenna mounting surface (5A) of said housing (5) is used as a main reflector of a parabola antenna.

11. The antenna integral-type transmitter/receiver system according to claim 1, further comprising a sheet heater (18) arranged inside said cover member (6).

12. The antenna integral-type transmitter/receiver system according to claim 1, further comprising an external interface connector (15) and a positional alignment member (16) arranged on an outer side surface of said housing (5) coaxially with respect to the antenna mounting center portion (O) and over a diagonal line (L) crossing said housing from the end surface to end surface.

13. The antenna integral-type transmitter/receiver system according to claim 1, wherein said housing (5) and said cover member (6) are made of a good conductive and good refractory member.

14. The antenna integral-type transmitter/receiver system according to claim 1, further comprising a device mounting fitment (20) arranged between said housing (5) and said antenna (7).

15. The antenna integral-type transmitter/receiver system according to claim 14, further comprising a device support member (21) for supporting said housing (5) via said device mounting fitment (20), and an attitude adjusting member (25) mounted on said device support member (21) for adjusting the attitude of said antenna (7) and said housing (5).

16. The antenna integral-type transmitter/receiver system according to claim 1, further comprising a device support member (21A) mounted on said housing (5) for supporting said housing (5) and said antenna (7), and an attitude adjusting unit (25A) mounted on said device support member (21A) for adjusting the attitude of said housing (5) and said antenna (7).

17. The antenna integral-type transmitter/receiver system according to claim 1, further comprising a sunshade cover (23) mounted on said housing (5) for covering said housing (5).

18. The antenna integral-type transmitter/receiver system according to claim 1, wherein a through opening corresponding to a waveguide is formed in the antenna mounting surface (5A) of said housing (5), said through opening acting as the device input/output unit (8D).

19. The antenna integral-type transmitter/receiver system comprising:

a housing (105) having an opening (105A) formed on one end surface thereof and including internally an intermediate frequency electrical circuit portion (3);

a base plate (117) which closes one end surface of said housing, said base plate on which a waveguide circuit unit (8) and a high-frequency electrical circuit unit (2) forming a transmission and reception function unit are mounted on the side surface of said housing (105), together with said intermediate frequency electrical circuit unit 3, said base plate having an antenna mounting surface (117A) formed on the opposite side surface to said housing (105); and an antenna (7) connected to said waveguide circuit unit (8) on said antenna mounting surface (117A) of said base plate (117).

20. The antenna integral-type transmitter/receiver system according to claim 19, wherein a through opening (80) corresponding to said waveguide (8C) is formed on said antenna mounting surface (117A) in said base plate (117), said through opening (80) acting as a device input/output portion (8D).

21. The antenna integral-type transmitter/receiver system according to claim 19, wherein said antenna mounting surface (117A) of said base plate (117) is formed as a device mounting fixture portion (90).

22. The antenna integral-type transmitter/receiver system according to claim 19, wherein said housing (105) is made of a synthetic resin housing (105); and wherein said device mounting fixture portion (90) is mounted on said antenna mounting surface (117A) of said base plate (117) which covers the opening (105A) of said housing (105).

23. The antenna integral-type transmitter/receiver system according to claim 19, wherein a display window (60) is formed on the end surface facing the end surface of said opening (105A) in said housing (105); and wherein said housing (105) includes a display unit (70) for displaying through said display window (60).

24. An antenna integral-type transmitter/receiver system comprising:

a housing (5) having one end surface in which an opening (5B) is formed and the other end surface in which an antenna mounting surface (5A) is formed, and including a transmitter/receiver function unit (13) formed of a waveguide circuit unit (8), a high-frequency electrical circuit unit (2), and an intermediate electrical circuit unit (3) inside the housing;

an antenna (7) connected to said transmitter/receiver function unit (13) mounted on the other end surface of said housing (5); and a cover member (6) for closing the opening (5B) of the one end surface of said housing (5), said waveguide circuit unit (8) and said high-frequency electrical circuit unit (2) forming a first unit (10), said intermediate electrical circuit unit (3) forming a second unit (11), said first unit (10) and said second unit (11) being arranged so as to be stacked in said housing (5), wherein said high-frequency electrical circuit unit (2) and said waveguide circuit unit (8) are arranged coaxially around a waveguide input/output unit (8D) connected to said antenna (7) in said waveguide circuit unit (8), and wherein said intermediate frequency electrical circuit unit (3) and power supply unit (4) are arranged outside said high-frequency electrical circuit unit (2) and said waveguide circuit unit (8).

* * * * *